US012568241B2

(12) United States Patent
Chen et al.

(10) Patent No.: US 12,568,241 B2
(45) Date of Patent: Mar. 3, 2026

(54) BI-PREDICTION WITH CU LEVEL WEIGHT (BCW)

(71) Applicant: Tencent America LLC, Palo Alto, CA (US)

(72) Inventors: Lien-Fei Chen, Hsinchu (TW); Xin Zhao, San Jose, CA (US); Xiaozhong Xu, State College, PA (US); Roman Chernyak, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 95 days.

(21) Appl. No.: 18/420,947

(22) Filed: Jan. 24, 2024

(65) Prior Publication Data

US 2024/0275999 A1     Aug. 15, 2024

Related U.S. Application Data

(60) Provisional application No. 63/444,891, filed on Feb. 10, 2023.

(51) Int. Cl.
*H04N 19/176* (2014.01)
*H04N 19/105* (2014.01)
(Continued)

(52) U.S. Cl.
CPC ........... *H04N 19/44* (2014.11); *H04N 19/105* (2014.11); *H04N 19/176* (2014.11); *H04N 19/182* (2014.11)

(58) Field of Classification Search
CPC ............................ H04N 19/44; H04N 19/105
See application file for complete search history.

(56) References Cited

U.S. PATENT DOCUMENTS 11,533,509 B2 * 12/2022 Li ........................... H04N 19/52
11,677,970 B2 * 6/2023 Ahn ..................... H04N 19/132
375/240.25
(Continued)

OTHER PUBLICATIONS

International Search Report and Written Opinion received for PCT Patent Application No. PCT/US2024/012871, mailed on Apr. 25, 2024, 7 pages.
(Continued)

*Primary Examiner* — Irfan Habib
(74) *Attorney, Agent, or Firm* — ARENTFOX SCHIFF LLP

(57) ABSTRACT

A method of decoding includes calculating a first cost value associated with a first sign value and a second cost value associated with a second sign value for a difference weighted bi-prediction, determining a selected sign value from the first sign value and the second sign value according to the first cost value and the second cost value, and determining a first weight value and a second weight value based on a difference between a first reference pixel of a first reference block in a first reference picture and a second reference pixel of a second reference block in a second reference picture for a current pixel in the current block. The method includes reconstructing the current pixel according to a weighted sum of the first reference pixel and the second reference pixel according to the first weight value, the second weigh value and the determined sign value.

20 Claims, 10 Drawing Sheets

900

TEMPLATE 925

Prediction block

TEMPLATE 921

Current block 901

(51) Int. Cl.
  H04N 19/182 (2014.01)
  H04N 19/44 (2014.01)

(56) References Cited

U.S. PATENT DOCUMENTS

| | | | | |
|---|---|---|---|---|
| 11,818,394 B2 * | 11/2023 | Kim | ...................... | H04N 19/547 |
| 11,831,920 B2 * | 11/2023 | Liu | ...................... | H04N 19/70 |
| 11,876,999 B2 * | 1/2024 | Lee | ...................... | H04N 19/159 |
| 12,047,583 B2 * | 7/2024 | Zhang | ...................... | H04N 19/70 |
| 2014/0321537 A1 * | 10/2014 | Sato | ...................... | H04N 19/18 |
| | | | | 375/240.03 |
| 2017/0142448 A1 * | 5/2017 | Karczewicz | ........... | H04N 19/91 |
| 2017/0353730 A1 * | 12/2017 | Liu | ...................... | H04N 19/159 |
| 2018/0295385 A1 * | 10/2018 | Alshin | ................ | H04N 19/159 |
| 2018/0359483 A1 * | 12/2018 | Chen | ...................... | H04N 19/70 |
| 2019/0313115 A1 * | 10/2019 | Chao | ...................... | H04N 19/176 |
| 2020/0107015 A1 * | 4/2020 | Seo | ...................... | H04N 19/172 |
| 2020/0244979 A1 * | 7/2020 | Li | ...................... | H04N 19/159 |
| 2020/0260071 A1 * | 8/2020 | Hannuksela | ......... | H04N 19/137 |
| 2020/0288150 A1 * | 9/2020 | Jun | ...................... | H04N 19/176 |
| 2020/0288157 A1 * | 9/2020 | Li | ...................... | H04N 19/105 |
| 2021/0314596 A1 * | 10/2021 | Wang | ................... | H04N 19/105 |
| 2022/0007048 A1 * | 1/2022 | He | ...................... | H04N 19/463 |
| 2022/0060743 A1 * | 2/2022 | Bordes | ................ | H04N 19/577 |
| 2022/0167001 A1 * | 5/2022 | Zhang | ................. | H04N 19/176 |
| 2022/0224911 A1 * | 7/2022 | Park | ................... | H04N 19/139 |
| 2022/0232233 A1 * | 7/2022 | Zhao | ................... | H04N 19/176 |
| 2022/0417521 A1 * | 12/2022 | Zhang | ................. | H04N 19/159 |
| 2022/0417522 A1 * | 12/2022 | Huang | ................ | H04N 19/513 |
| 2023/0007238 A1 * | 1/2023 | Chen | ................... | H04N 19/55 |
| 2023/0054289 A1 * | 2/2023 | Li | ...................... | H04N 19/513 |
| 2023/0336772 A1 * | 10/2023 | Li | ...................... | H04N 19/513 |
| 2023/0396797 A1 * | 12/2023 | Li | ...................... | H04N 19/176 |
| 2024/0048718 A1 * | 2/2024 | Filippov | ............ | H04N 19/176 |
| 2024/0064284 A1 * | 2/2024 | Kalva | ................... | H04N 19/90 |
| 2024/0275999 A1 * | 8/2024 | Chen | ................... | H04N 19/577 |

OTHER PUBLICATIONS

Muhammed Coban, et al., Algorithm description of Enhanced Compression Model 8 (ECM 8), Joint Video Experts Team (JVET) of ITU-T SG 16 WP 3 and ISO/IEC JTC 1/SC 29 29th Meeting, by teleconference, Jan. 11-20, 2023, Document: JVET-AC2025, pp. 1-73.

* cited by examiner

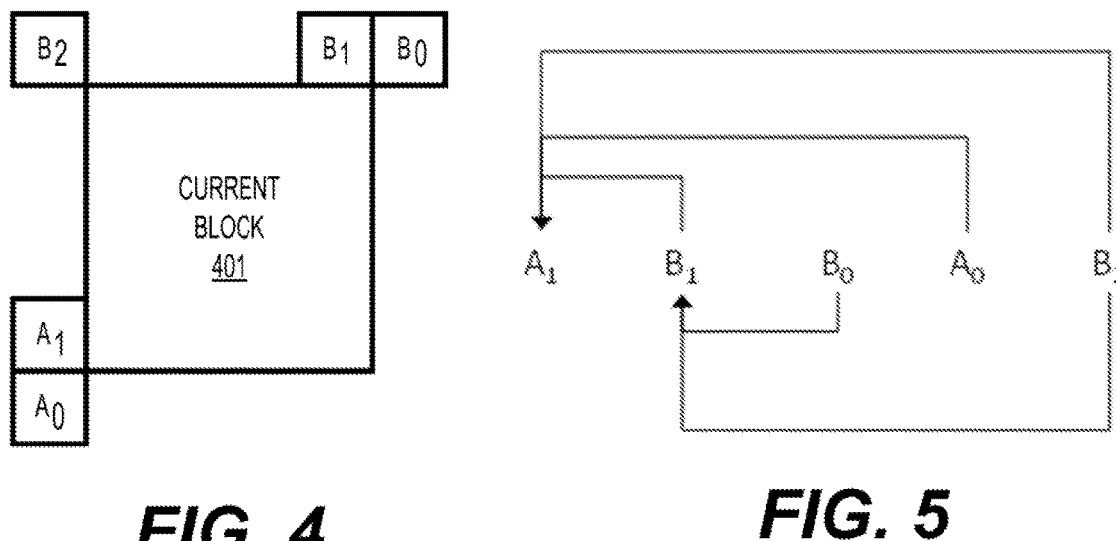
FIG. 4          FIG. 5
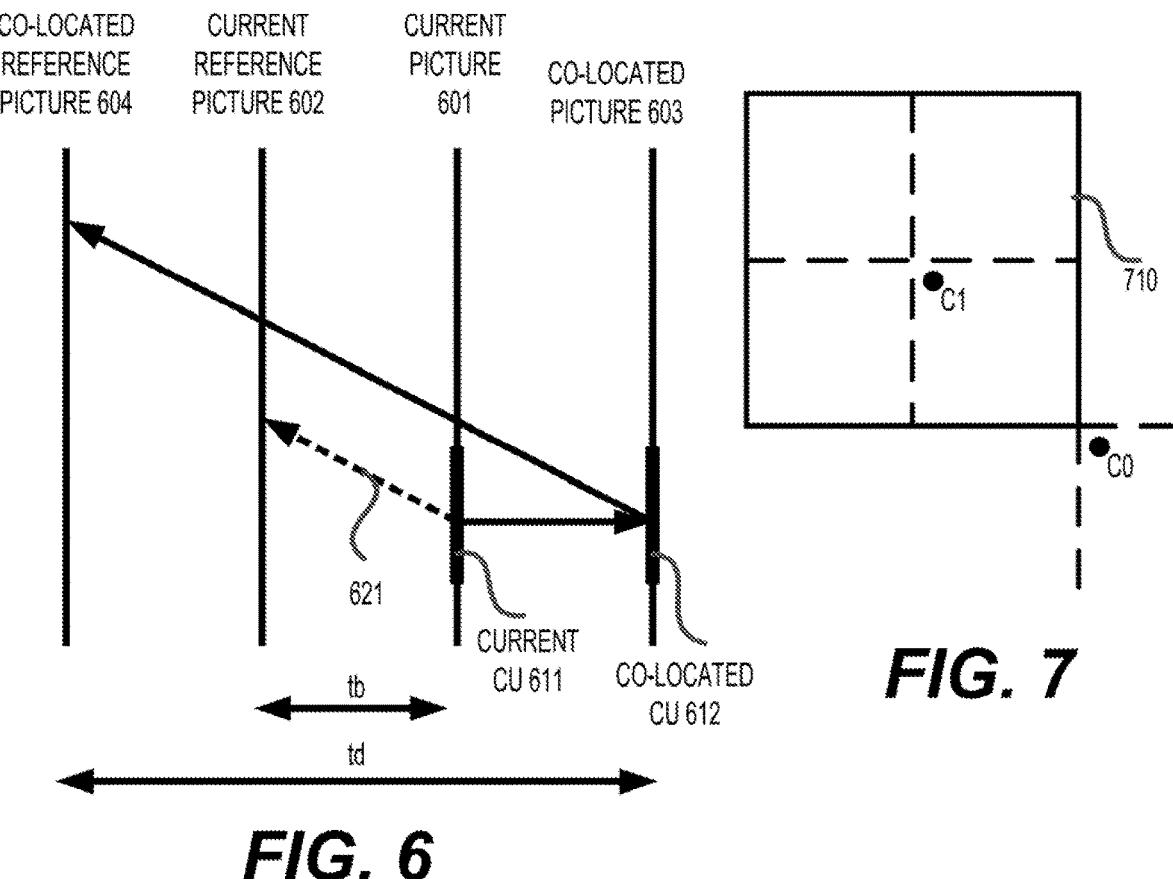
FIG. 6          FIG. 7

Current block 1001

BI-PREDICTION WITH CU LEVEL WEIGHT (BCW)

INCORPORATION BY REFERENCE

The present application claims the benefit of priority to U.S. Provisional Application No. 63/444,891, "Improvement Of Bi-Prediction With CU Level Weight (BCW)" filed on Feb. 10, 2023, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image/video compression can help transmit image/video data across different devices, storage and networks with minimal quality degradation. In some examples, video codec technology can compress video based on spatial and temporal redundancy. In an example, a video codec can use techniques referred to as intra prediction that can compress an image based on spatial redundancy. For example, the intra prediction can use reference data from the current picture under reconstruction for sample prediction. In another example, a video codec can use techniques referred to as inter prediction that can compress an image based on temporal redundancy. For example, the inter prediction can predict samples in a current picture from a previously reconstructed picture with motion compensation. The motion compensation can be indicated by a motion vector (MV).

SUMMARY

Aspects of the disclosure include methods and apparatuses for video encoding/decoding. In some examples, an apparatus for video decoding includes processing circuitry for performing video encoding and decoding. A method of video decoding includes receiving a coded video bitstream including coded information of a current block in a current picture. The coded information is indicative of bi-prediction with a weight selected from a plurality of weight candidates, the plurality of weight candidates includes at least a first weight candidate and a second weight candidate. The first weight candidate corresponds to a difference weighted bi-prediction with a first sign value and the second weight candidate corresponds to the difference weighted bi-prediction with a second sign value. The difference weighted bi-prediction uses pixel difference to derive weights of bi-prediction at a pixel level, and uses a sign value to indicate a direction of a larger weight value for the difference weighted bi-prediction. The method also includes calculating a first cost value for the difference weighted bi-prediction with the first sign value and a second cost value for the difference weighted bi-prediction with the second sign value, determining a selected sign value from the first sign value and the second sign value according to the first cost value and the second cost value, and determining a first weight value and a second weight value based on a difference between a first reference pixel and a second reference pixel for a current pixel in the current block. The first reference pixel is in a first reference block from a first reference picture, the second reference pixel is in a second reference block from a second reference picture. Further, the method includes reconstructing the current pixel based on a weighted sum of the first reference pixel and the second reference pixel according to the first weight value, the second weight value and the selected sign value.

In some examples, to calculate the first cost value and the second cost value, the method includes generating a first reference template for a current template of the current block according to the first weight candidate (e.g., the first sign value), calculating a first template matching cost between the first reference template and the current template as the first cost value, generating a second reference template for the current template of the current block according to the second weight candidate (e.g., the second sign value) and calculating a second template matching cost between the second reference template and the current template as the second cost value.

In some examples, to determine the selected sign value, the method includes determining the selected sign value that has a lowest cost value.

In some examples, to determine the selected sign value, the method includes reordering the first reference block and the second reference block in a list according to the first cost value associated with the first sign value and the second cost value associated with the second sign value, the first sign value indicates the first reference block with a higher weight value, the second sign value indicates the second reference block with a higher weight value. The method includes determining, according to a context model, a flag that indicates a most probable reference block from the list.

In some examples, to calculate the first cost value and the second cost value, the method includes generating a first reconstruction block for the current block according to the first sign value, calculating a first boundary cost between a boundary of the first reconstruction block and reconstructed neighboring samples of the current block as the first cost value, generating a second reconstruction block for the current block according to the second sign value, and calculating a second boundary cost between a boundary of the second reconstruction block and the reconstructed neighboring samples of the current block as the second cost value.

In an example, to generate the first reconstruction block, the method includes combining a residual block of the current block with a prediction block that is predicted by the difference weighted bi-prediction with the first sign value to generate the first reconstruction block.

In some examples, to determine the selected sign value, the method includes determining that a neighboring block of the current block is coded with the difference weighted bi-prediction, and determining the selected sign value according to a reference index used by the neighboring block.

In some examples, the plurality of weight candidates comprises the first weight candidate and the second weight candidate associated with different sign values for the difference weighted bi-prediction, and multiple weight candidates of bi-prediction with coding unit level weight (BCW) with different weights. In an example, the method further includes decoding a flag from the coded information of the current block that indicates one of the difference weighted bi-prediction and the BCW. In response to the flag indicating the difference weighted bi-prediction, the method includes decoding a first syntax that indicates a weight candidate from the first weight candidate and the second weight candidate. In response to the flag indicating the BCW, the method includes decoding a second syntax that indicates a specific weight candidate of the BCW.

In some examples, the method includes calculating template matching cost values respectively for the plurality of weight candidates, and selecting a weight candidate with a lowest template matching value.

In some examples, the method includes calculating template matching cost values respectively for the plurality of weight candidates. In response to a lowest template matching cost value being associated with the difference weighted bi-prediction, the method includes decoding, from the coded information of the current block, a first syntax that indicates a weight candidate from the first weight candidate and the second weight candidate. In response to the lowest template matching cost value being associated with the BCW, the method includes decoding, from the coded information of the current block, a second syntax that indicates a specific weight candidate of the BCW.

In some examples, the method includes calculating template matching cost values respectively for the plurality of weight candidates, reordering the plurality of weight candidates according to the template matching cost values, and decoding, from the coded information of the current block, a syntax that indicates a weight candidate from the plurality of weight candidates that are reordered.

According to another aspect of the disclosure, an apparatus is provided. The apparatus includes processing circuitry. The processing circuitry can be configured to perform any of the described methods for video decoding/encoding.

Aspects of the disclosure also provide a non-transitory computer-readable medium storing instructions which, when executed by a computer, cause the computer to perform any of the described methods for video decoding/encoding.

BRIEF DESCRIPTION OF THE DRAWINGS

Further features, the nature, and various advantages of the disclosed subject matter will be more apparent from the following detailed description and the accompanying drawings in which:

FIG. 4 shows positions of spatial merge candidates in some examples.

FIG. 5 shows candidate pairs that are considered for a redundancy check of spatial merge candidates in some examples.

FIG. 6 shows exemplary motion vector scaling for a temporal merge candidate.

FIG. 7 shows exemplary candidate positions for a temporal merge candidate of a current coding block.

DETAILED DESCRIPTION OF EMBODIMENTS

Figure 1:
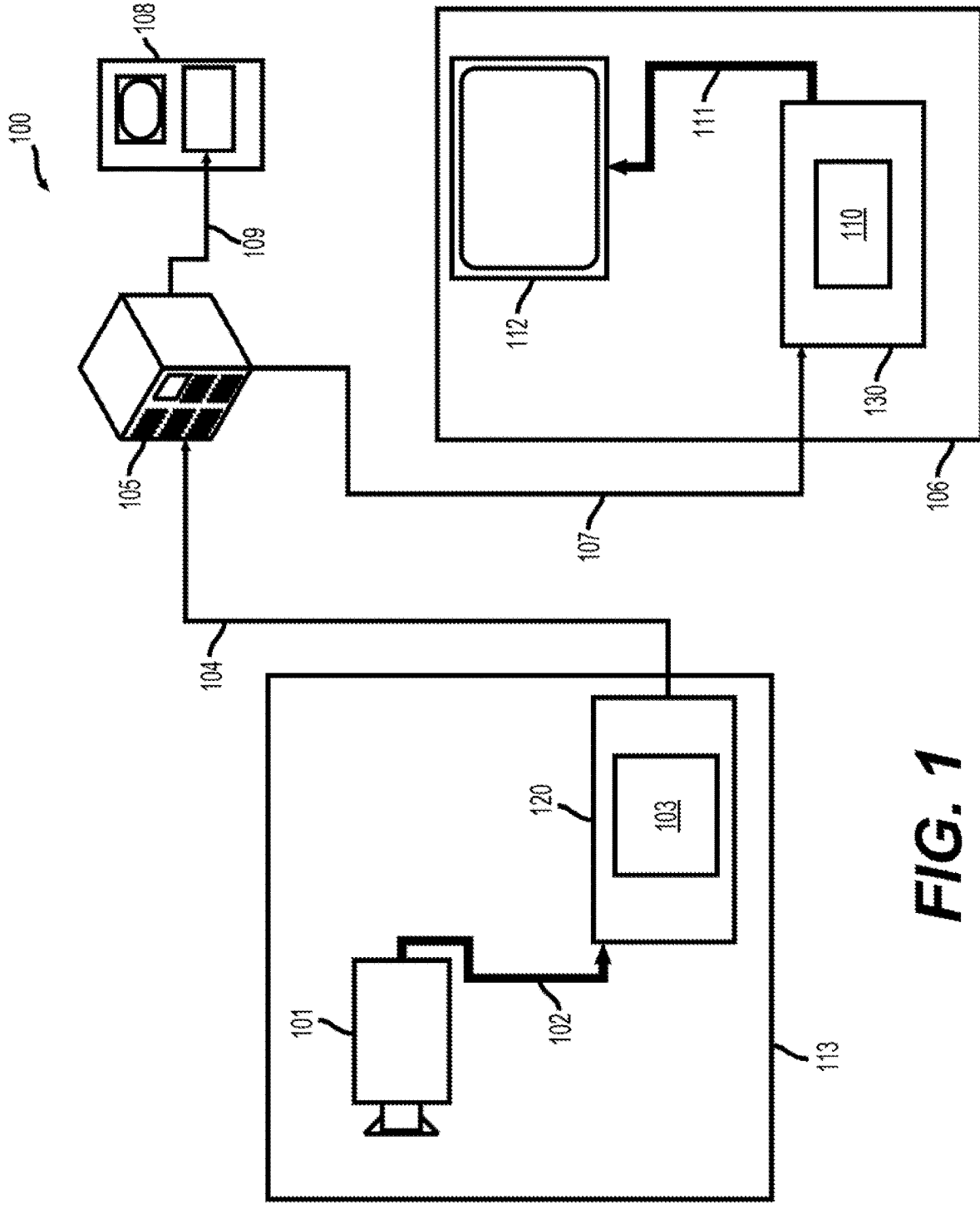
FIG. 1 is a schematic illustration of an exemplary block diagram of a communication system.

FIG. 1 shows a block diagram of a video processing system (100) in some examples. The video processing system (100) is an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

The video processing system (100) includes a capture subsystem (113), that can include a video source (101), for example a digital camera, creating for example a stream of video pictures (102) that are uncompressed. In an example, the stream of video pictures (102) includes samples that are taken by the digital camera. The stream of video pictures (102), depicted as a bold line to emphasize a high data volume when compared to encoded video data (104) (or coded video bitstreams), can be processed by an electronic device (120) that includes a video encoder (103) coupled to the video source (101). The video encoder (103) can include hardware, software, or a combination thereof to enable or implement aspects of the disclosed subject matter as described in more detail below. The encoded video data (104) (or encoded video bitstream), depicted as a thin line to emphasize the lower data volume when compared to the stream of video pictures (102), can be stored on a streaming server (105) for future use. One or more streaming client subsystems, such as client subsystems (106) and (108) in FIG. 1 can access the streaming server (105) to retrieve copies (107) and (109) of the encoded video data (104). A client subsystem (106) can include a video decoder (110), for example, in an electronic device (130). The video decoder (110) decodes the incoming copy (107) of the encoded video data and creates an outgoing stream of video pictures (111) that can be rendered on a display (112) (e.g., display screen) or other rendering device (not depicted). In some streaming systems, the encoded video data (104), (107), and (109) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (120) and (130) can include other components (not shown). For example, the electronic device (120) can include a video decoder (not shown) and the electronic device (130) can include a video encoder (not shown) as well.

Figure 2:
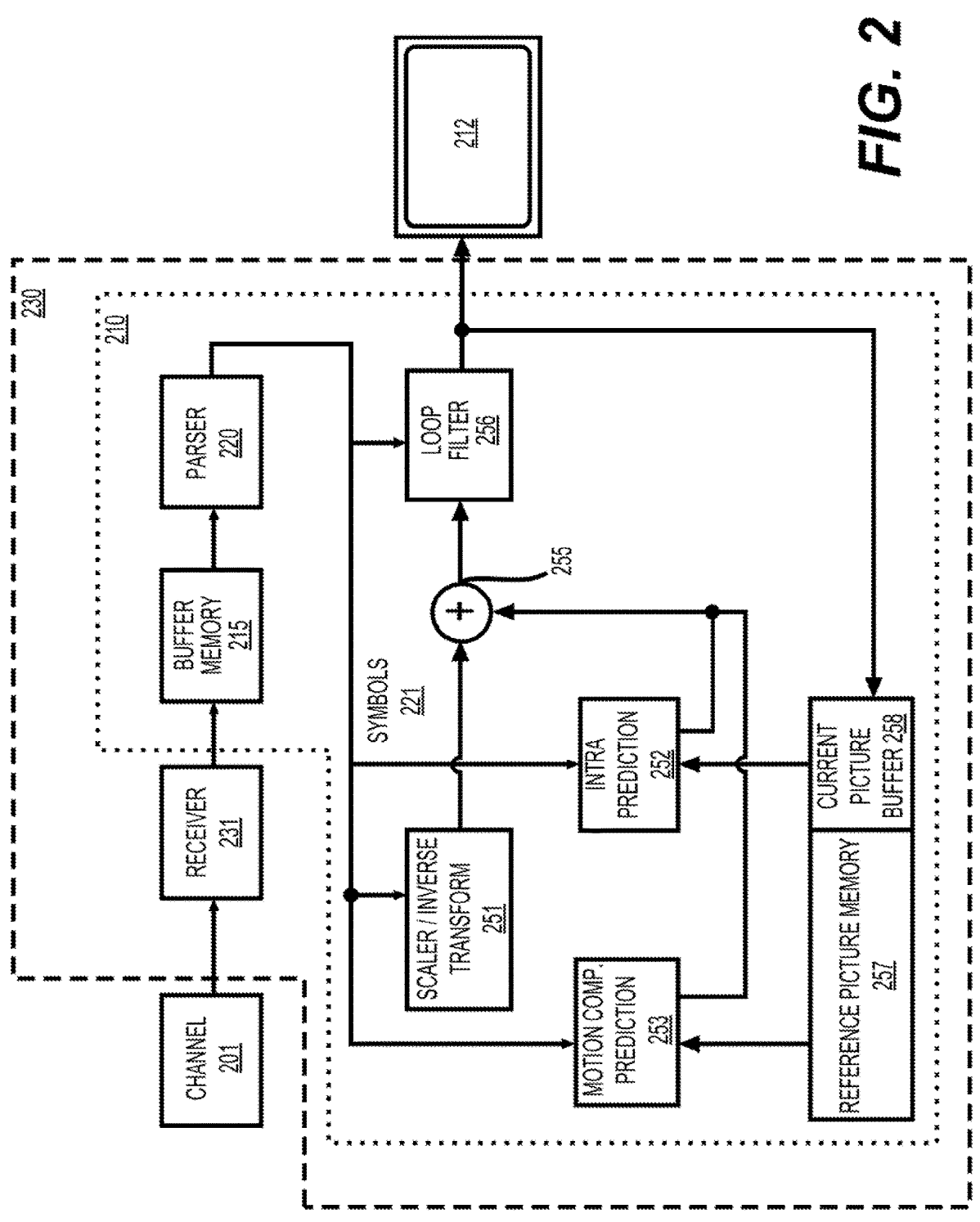
FIG. 2 is a schematic illustration of an exemplary block diagram of a decoder.

FIG. 2 shows an exemplary block diagram of a video decoder (210). The video decoder (210) can be included in an electronic device (230). The electronic device (230) can include a receiver (231) (e.g., receiving circuitry). The video decoder (210) can be used in the place of the video decoder (110) in the FIG. 1 example.

The receiver (231) may receive one or more coded video sequences, included in a bitstream for example, to be decoded by the video decoder (210). In an embodiment, one coded video sequence is received at a time, where the decoding of each coded video sequence is independent from the decoding of other coded video sequences. The coded video sequence may be received from a channel (201), which may be a hardware/software link to a storage device which stores the encoded video data. The receiver (231) may receive the encoded video data with other data, for example, coded audio data and/or ancillary data streams, that may be forwarded to their respective using entities (not depicted). The receiver (231) may separate the coded video sequence from the other data. To combat network jitter, a buffer memory (215) may be coupled in between the receiver (231) and an entropy decoder/parser (220) ("parser (220)" henceforth). In certain applications, the buffer memory (215) is part of the video decoder (210). In others, it can be outside of the video decoder (210) (not depicted). In still others, there can be a buffer memory (not depicted) outside of the video decoder (210), for example to combat network jitter, and in addition another buffer memory (215) inside the video decoder (210), for example to handle playout timing. When the receiver (231) is receiving data from a store/forward device of sufficient bandwidth and controllability, or from an isosynchronous network, the buffer memory (215) may not be needed, or can be small. For use on best effort packet networks such as the Internet, the buffer memory (215) may be required, can be comparatively large and can be advantageously of adaptive size, and may at least partially be implemented in an operating system or similar elements (not depicted) outside of the video decoder (210).

The video decoder (210) may include the parser (220) to reconstruct symbols (221) from the coded video sequence. Categories of those symbols include information used to manage operation of the video decoder (210), and potentially information to control a rendering device such as a render device (212) (e.g., a display screen) that is not an integral part of the electronic device (230) but can be coupled to the electronic device (230), as shown in FIG. 2. The control information for the rendering device(s) may be in the form of Supplemental Enhancement Information (SEI) messages or Video Usability Information (VUI) parameter set fragments (not depicted). The parser (220) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (220) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (220) may also extract from the coded video sequence information such as transform coefficients, quantizer parameter values, motion vectors, and so forth.

The parser (220) may perform an entropy decoding/parsing operation on the video sequence received from the buffer memory (215), so as to create symbols (221).

Reconstruction of the symbols (221) can involve multiple different units depending on the type of the coded video picture or parts thereof (such as: inter and intra picture, inter and intra block), and other factors. Which units are involved, and how, can be controlled by subgroup control information parsed from the coded video sequence by the parser (220).

The flow of such subgroup control information between the parser (220) and the multiple units below is not depicted for clarity.

Beyond the functional blocks already mentioned, the video decoder (210) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (251). The scaler/inverse transform unit (251) receives a quantized transform coefficient as well as control information, including which transform to use, block size, quantization factor, quantization scaling matrices, etc. as symbol(s) (221) from the parser (220). The scaler/inverse transform unit (251) can output blocks comprising sample values, that can be input into aggregator (255).

In some cases, the output samples of the scaler/inverse transform unit (251) can pertain to an intra coded block. The intra coded block is a block that is not using predictive information from previously reconstructed pictures, but can use predictive information from previously reconstructed parts of the current picture. Such predictive information can be provided by an intra picture prediction unit (252). In some cases, the intra picture prediction unit (252) generates a block of the same size and shape of the block under reconstruction, using surrounding already reconstructed information fetched from the current picture buffer (258). The current picture buffer (258) buffers, for example, partly reconstructed current picture and/or fully reconstructed current picture. The aggregator (255), in some cases, adds, on a per sample basis, the prediction information the intra prediction unit (252) has generated to the output sample information as provided by the scaler/inverse transform unit (251).

In other cases, the output samples of the scaler/inverse transform unit (251) can pertain to an inter coded, and potentially motion compensated, block. In such a case, a motion compensation prediction unit (253) can access reference picture memory (257) to fetch samples used for prediction. After motion compensating the fetched samples in accordance with the symbols (221) pertaining to the block, these samples can be added by the aggregator (255) to the output of the scaler/inverse transform unit (251) (in this case called the residual samples or residual signal) so as to generate output sample information. The addresses within the reference picture memory (257) from where the motion compensation prediction unit (253) fetches prediction samples can be controlled by motion vectors, available to the motion compensation prediction unit (253) in the form of symbols (221) that can have, for example X, Y, and reference picture components. Motion compensation also can include interpolation of sample values as fetched from the reference picture memory (257) when sub-sample exact motion vectors are in use, motion vector prediction mechanisms, and so forth.

The output samples of the aggregator (255) can be subject to various loop filtering techniques in the loop filter unit (256). Video compression technologies can include in-loop filter technologies that are controlled by parameters included in the coded video sequence (also referred to as coded video bitstream) and made available to the loop filter unit (256) as symbols (221) from the parser (220). Video compression can also be responsive to meta-information obtained during the decoding of previous (in decoding order) parts of the coded picture or coded video sequence, as well as responsive to previously reconstructed and loop-filtered sample values.

The output of the loop filter unit (256) can be a sample stream that can be output to the render device (212) as well as stored in the reference picture memory (257) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (220)), the current picture buffer (258) can become a part of the reference picture memory (257), and a fresh current picture buffer can be reallocated before commencing the reconstruction of the following coded picture.

The video decoder (210) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example mega-samples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (231) may receive additional (redundant) data with the encoded video. The additional data may be included as part of the coded video sequence(s). The additional data may be used by the video decoder (210) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 3:
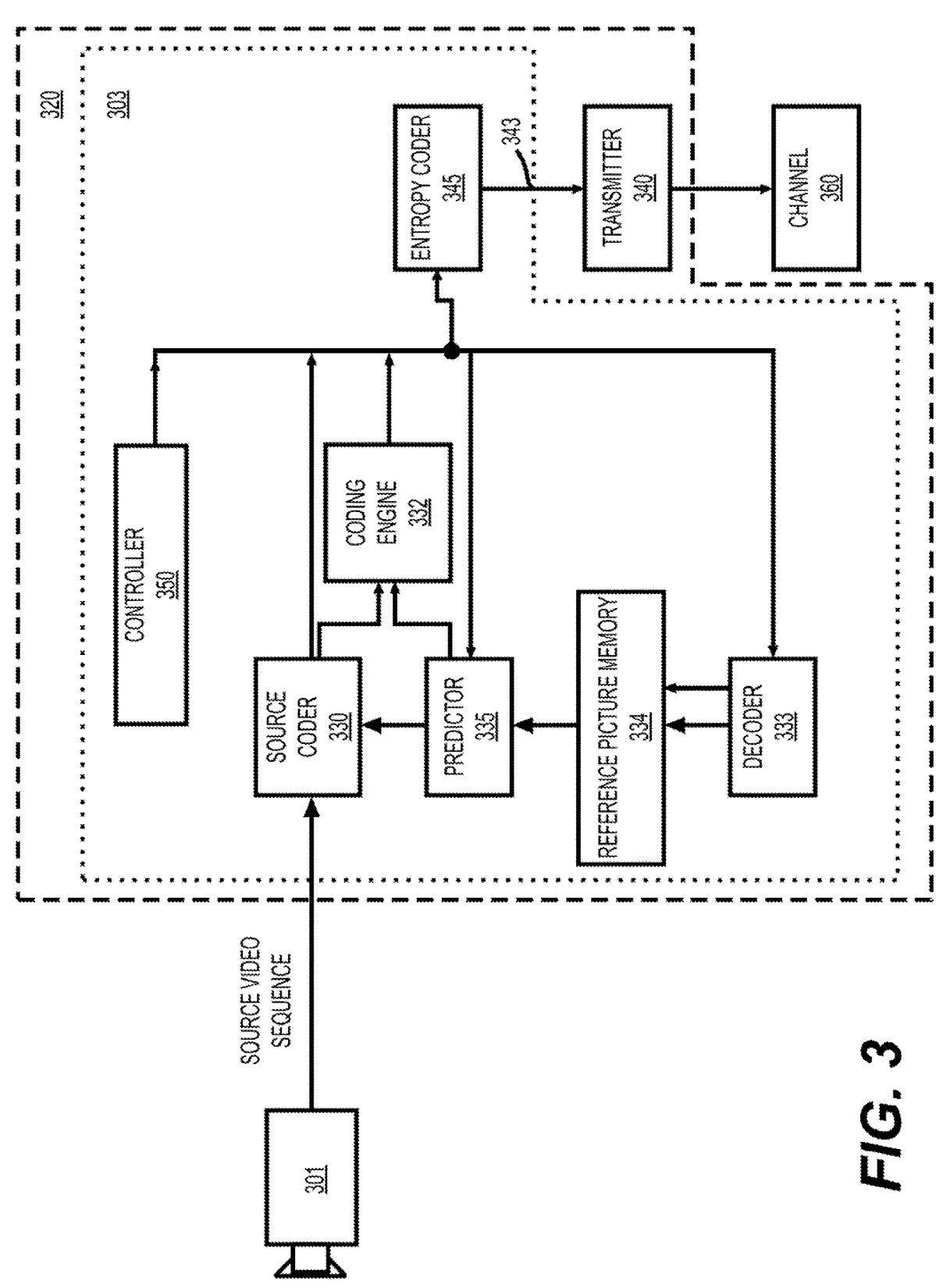
FIG. 3 is a schematic illustration of an exemplary block diagram of an encoder.

FIG. 3 shows an exemplary block diagram of a video encoder (303). The video encoder (303) is included in an electronic device (320). The electronic device (320) includes a transmitter (340) (e.g., transmitting circuitry). The video encoder (303) can be used in the place of the video encoder (103) in the FIG. 1 example.

The video encoder (303) may receive video samples from a video source (301) (that is not part of the electronic device (320) in the FIG. 3 example) that may capture video image(s) to be coded by the video encoder (303). In another example, the video source (301) is a part of the electronic device (320).

The video source (301) may provide the source video sequence to be coded by the video encoder (303) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (301) may be a storage device storing previously prepared video. In a videoconferencing system, the video source (301) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. The description below focuses on samples.

According to an embodiment, the video encoder (303) may code and compress the pictures of the source video sequence into a coded video sequence (343) in real time or under any other time constraints as required. Enforcing appropriate coding speed is one function of a controller (350). In some embodiments, the controller (350) controls other functional units as described below and is functionally coupled to the other functional units. The coupling is not depicted for clarity. Parameters set by the controller (350) can include rate control related parameters (picture skip, quantizer, lambda value of rate-distortion optimization techniques, . . . ), picture size, group of pictures (GOP) layout, maximum motion vector search range, and so forth. The controller (350) can be configured to have other suitable functions that pertain to the video encoder (303) optimized for a certain system design.

In some embodiments, the video encoder (303) is configured to operate in a coding loop. As an oversimplified description, in an example, the coding loop can include a source coder (330) (e.g., responsible for creating symbols, such as a symbol stream, based on an input picture to be coded, and a reference picture(s)), and a (local) decoder (333) embedded in the video encoder (303). The decoder (333) reconstructs the symbols to create the sample data in a similar manner as a (remote) decoder also would create. The reconstructed sample stream (sample data) is input to the reference picture memory (334). As the decoding of a symbol stream leads to bit-exact results independent of decoder location (local or remote), the content in the reference picture memory (334) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (333) can be the same as a "remote" decoder, such as the video decoder (210), which has already been described in detail above in conjunction with FIG. 2. Briefly referring also to FIG. 2, however, as symbols are available and encoding/decoding of symbols to a coded video sequence by an entropy coder (345) and the parser (220) can be lossless, the entropy decoding parts of the video decoder (210), including the buffer memory (215), and parser (220) may not be fully implemented in the local decoder (333).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (330) may perform motion compensated predictive coding, which codes an input picture predictively with reference to one or more previously coded picture from the video sequence that were designated as "reference pictures." In this manner, the coding engine (332) codes differences between pixel blocks of an input picture and pixel blocks of reference picture(s) that may be selected as prediction reference(s) to the input picture.

The local video decoder (333) may decode coded video data of pictures that may be designated as reference pictures, based on symbols created by the source coder (330). Operations of the coding engine (332) may advantageously be lossy processes. When the coded video data may be decoded at a video decoder (not shown in FIG. 3), the reconstructed video sequence typically may be a replica of the source video sequence with some errors. The local video decoder (333) replicates decoding processes that may be performed by the video decoder on reference pictures and may cause reconstructed reference pictures to be stored in the reference picture memory (334). In this manner, the video encoder (303) may store copies of reconstructed reference pictures locally that have common content as the reconstructed reference pictures that will be obtained by a far-end video decoder (absent transmission errors).

The predictor (335) may perform prediction searches for the coding engine (332). That is, for a new picture to be coded, the predictor (335) may search the reference picture memory (334) for sample data (as candidate reference pixel blocks) or certain metadata such as reference picture motion vectors, block shapes, and so on, that may serve as an appropriate prediction reference for the new pictures. The predictor (335) may operate on a sample block-by-pixel block basis to find appropriate prediction references. In some cases, as determined by search results obtained by the predictor (335), an input picture may have prediction references drawn from multiple reference pictures stored in the reference picture memory (334).

The controller (350) may manage coding operations of the source coder (330), including, for example, setting of parameters and subgroup parameters used for encoding the video data.

Output of all aforementioned functional units may be subjected to entropy coding in the entropy coder (345). The entropy coder (345) translates the symbols as generated by the various functional units into a coded video sequence, by applying lossless compression to the symbols according to technologies such as Huffman coding, variable length coding, arithmetic coding, and so forth.

The transmitter (340) may buffer the coded video sequence(s) as created by the entropy coder (345) to prepare for transmission via a communication channel (360), which may be a hardware/software link to a storage device which would store the encoded video data. The transmitter (340) may merge coded video data from the video encoder (303) with other data to be transmitted, for example, coded audio data and/or ancillary data streams (sources not shown).

The controller (350) may manage operation of the video encoder (303). During coding, the controller (350) may assign to each coded picture a certain coded picture type, which may affect the coding techniques that may be applied to the respective picture. For example, pictures often may be assigned as one of the following picture types:

An Intra Picture (I picture) may be coded and decoded without using any other picture in the sequence as a source of prediction. Some video codecs allow for different types of intra pictures, including, for example Independent Decoder Refresh ("IDR") Pictures.

A predictive picture (P picture) may be coded and decoded using intra prediction or inter prediction using a motion vector and reference index to predict the sample values of each block.

A bi-directionally predictive picture (B Picture) may be coded and decoded using intra prediction or inter prediction using two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (303) may perform coding operations according to a predetermined video coding technology or standard, such as ITU-T Rec. H.265. In its operation, the video encoder (303) may perform various compression operations, including predictive coding operations that exploit temporal and spatial redundancies in the input video sequence. The coded video data, therefore, may conform to a syntax specified by the video coding technology or standard being used.

In an embodiment, the transmitter (340) may transmit additional data with the encoded video. The source coder (330) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB) and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

It is noted that the video encoders (103) and (303), and the video decoders (110) and (210) can be implemented using any suitable technique. In an embodiment, the video encoders (103) and (303) and the video decoders (110) and (210) can be implemented using one or more integrated circuits. In another embodiment, the video encoders (103) and (303), and the video decoders (110) and (210) can be implemented using one or more processors that execute software instructions.

Aspects of the disclosure provide techniques for bi-prediction with CU level weight (BCW).

Various inter prediction modes can be used in video coding. For example, in VVC, for an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 4.

FIG. 4 shows positions of spatial merge candidates according to an embodiment of the disclosure. Referring to FIG. 4, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

To reduce computational complexity, not all possible candidate pairs are considered in the mentioned redundancy check. Instead, only pairs linked with an arrow in FIG. 5 are considered and a candidate is only added to the candidate list if the corresponding candidate used for the redundancy check does not have the same motion information.

FIG. 5 shows candidate pairs that are considered for a redundancy check of spatial merge candidates according to an embodiment of the disclosure. Referring to FIG. 5, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

In an embodiment, temporal candidate(s) are derived as follows. In an example, only one temporal merge candidate is added to the candidate list. FIG. 6 shows exemplary motion vector scaling for a temporal merge candidate. To derive the temporal merge candidate of a current CU (611)

in a current picture (601), a scaled MV (621) (e.g., shown by a dotted line in FIG. 6) can be derived based on a co-located CU (612) belonging to a collocated reference picture (604). A reference picture list used to derive the co-located CU (612) can be explicitly signaled in a slice header. The scaled MV (621) for the temporal merge candidate can be obtained as shown by the dotted line in FIG. 6. The scaled MV (621) can be scaled from the MV of the co-located CU (612) using picture order count (POC) distances tb and td. The POC distance tb can be defined to be the POC difference between a current reference picture (602) of the current picture (601) and the current picture (601). The POC distance td can be defined to be the POC difference between the collocated reference picture (604) of the co-located picture (603) and the co-located picture (603). A reference picture index of the temporal merge candidate can be set to zero. The collocated picture is a reference picture that is used as the source picture for temporal motion information derivation. The collocated picture can be identified in one of two lists, referred to as list0 or list1. In some examples, the encoder can determine the collocated picture and signal the collocated picture using suitable syntax techniques.

FIG. 7 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (710) of the current CU. The candidate position C1 is located at a center of the co-located CU (710) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, inter coded, and in the current row of CTUs, the candidate position C0 is used to derive the temporal merge candidate.

In some examples, bi-prediction with CU-level weight (BCW) can be used to weight predictions from different reference pictures differently. The BCW technology is designed to predict a block by weighted-averaging two motion-compensated prediction blocks. BCW is different from a technique that is referred to as weighting prediction (WP) which indicates weights at slice level. BCW can signal the weight information at CU level by using an index, denoted as bcwIdx. The index can point to a selected weight from a list of pre-defined candidate weights. In some examples, the list includes 5 candidate weights that are pre-defined, such as {−2, 3, 4, 5, 10}/8, to be selected for reference pictures in reference list 1 (also referred to as reference picture list 1), where −2/8 and 10/8 can be used to reduce negatively correlated noises between prediction blocks of bi-prediction. The list of the pre-defined candidate weights may be reduced to {3, 4, 5}/8 when the forward and backward reference pictures in both reference lists are used to achieve better trade-off between performance and complexity. In some examples, since unit-gain constraint is applied, once the weight, denoted as w pointed to by bcwIdx, corresponding to reference list 1 is determined, the weight corresponding to the other reference list can be calculated by 1-w. In an example, each luma/chroma prediction sample of BCW is computed as Eq. (1):

$$P_{BCW} = (8(1-w) \times P_0 + 8w \times P_1 + 4) \gg 3 \qquad \text{Eq. (1)}$$

where $P_{BCW}$ is the final prediction of a current-block sample (a sample in the current block) and $P_0$ and $P_1$ are prediction samples pointed to by the motion vectors respectively from reference picture in list 0 (also referred to as reference picture list 0) and reference picture in list 1 (also referred to as reference picture list 1). In some examples, BCW is enabled only for bi-predicted CUs with at least 256 luma samples and WP being turned off. The BCW is also extended to affine AMVP modes.

In some examples, the use of bcwIdx can be buffered for subsequent CUs in the same frame to perform spatial motion merging, either for regular or for affine merge mode. In an example, when a spatial neighboring merge candidate is bi-predicted and the current CU selects this candidate (the spatial neighboring merge candidate), all the reference indices and motion vectors (or control point motion vectors (CPMV) in the case of inherited affine merge mode) including its bcwIdx are inherited by the current CU. In some examples, the only exception that the bcwIdx is not inherited occurs when the current CU has CIIP flag enabled. In the case of constructed affine merge mode, the bcwIdx is inherited from the one associated with above-left control-point motion vectors (or above-right control-point motion vectors when above-left ones are not used). It is noted that when the inferred bcwIdx points to a non-0.5 weight, decoder-side motion vector refinement (DMVR) and bidirectional optical flow (BDOF) are both turned off.

In some examples (e.g., ECM), the BCW index for merge coded CUs is derived based on template matching (TM) cost instead of being derived from neighboring blocks. In an example, for a selected merge candidate, the TM cost values are calculated with different bi-prediction weights, and then, the bi-prediction weight with minimum TM cost value is used to predict the merge CU.

In some examples, to calculate TM cost for bi-predicted weights (also referred to as bi-prediction weights), some rules are applied. For example, three rules can be applied. According to a first rule, since the inherited bi-predicted weight is likely to have higher accuracy than other weights, only the inherited bi-prediction weight and its two neighboring weights (e.g., ±1) are considered. For example, when the inherited bi-predicted weight is 4, then three weights {3, 4, 5} are involved in TM cost calculation. According to a second rule, the TM cost of the inherited BCW index is multiplied with 0.90625, that is, the cost is reduced by 3/32. According to a third rule, the TM cost of the equal weight is multiplied with 0.90625 since bi-predicted samples are beneficial for BDOF and BDOF is only applied to CU with equal weights.

In some examples, the template matching based BCW index derivation is applied to CUs coded in regular merge, template matching, adaptive decoder-side motion vector refinement and MMVD modes. In addition, in some examples, the bi-prediction weights for merge mode are extended from {−2, 3, 4, 5, 10} to {1, 2, 3, 4, 5, 6, 7}. Furthermore, the negative bi-predicted weights for non-merge mode {−2, 10} are replaced with positive weights {1, 7}.

In some examples, template matching (TM) technique that refines motion at the decoder side can be used in video/image coding (e.g., VVC, ECM and the like) to further improve the compression efficiency. In the TM mode, an MV can be refined by constructing a template (e.g., a current template) of a block (e.g., a current block) in a current picture and determine the closest matching between the template of the block in the current picture and a plurality of possible templates (e.g., a plurality of possible reference templates) in a reference picture. In an embodiment, the template of the block in the current picture can include left neighboring reconstructed samples of the block and above neighboring reconstructed samples of the block.

Figure 8:
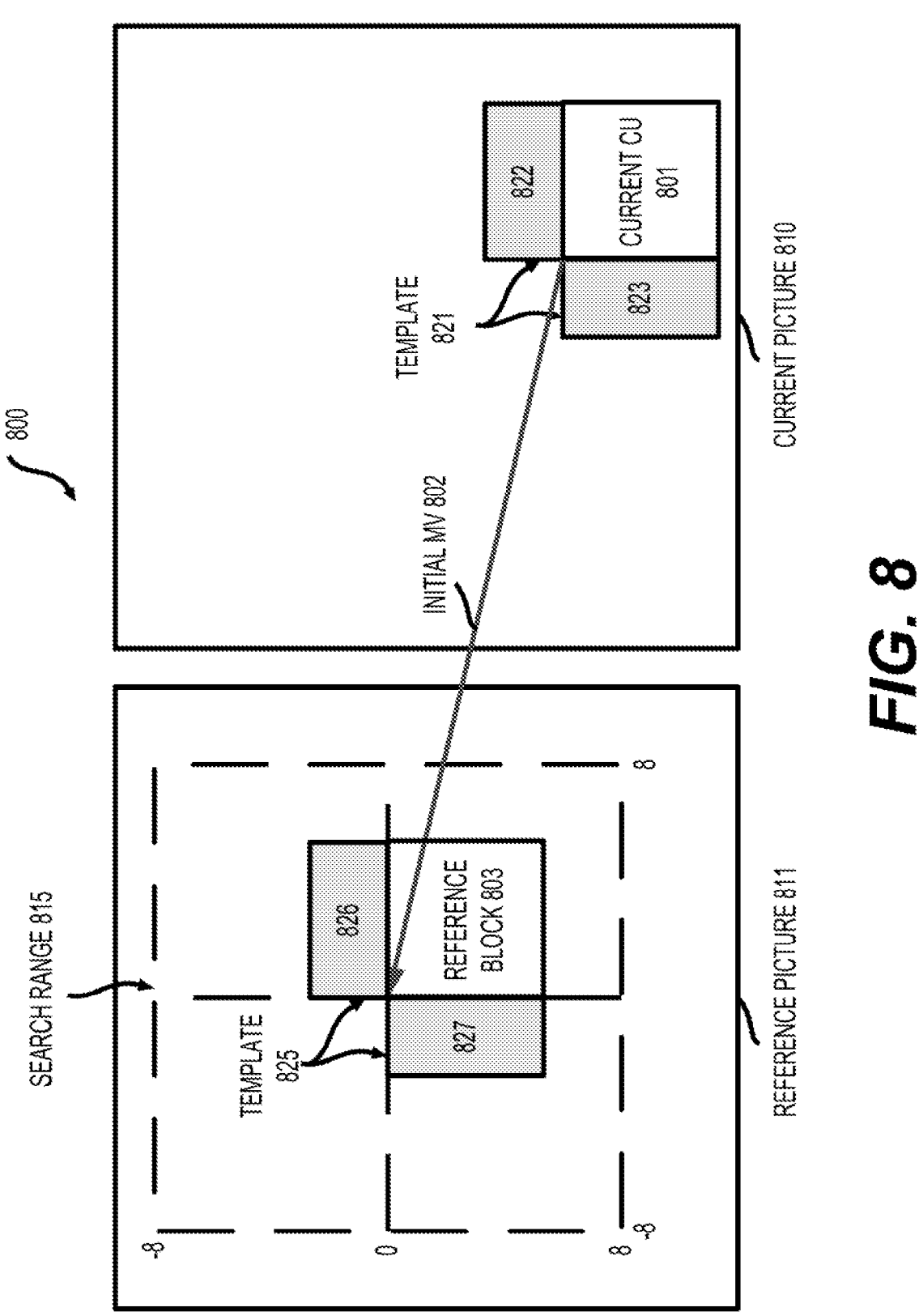
FIG. 8 shows an example of template matching.

FIG. 8 shows an example of template matching (800). The TM can be used to derive motion information (e.g., deriving final motion information from initial motion information, such as an initial MV 802) of a current CU (e.g., a current block) (801) by determining the closest match between a template (e.g., a current template) (821) of the current CU (801) in a current picture (810) and a template (e.g., a reference template) of a plurality of possible templates (e.g., one of the plurality of possible templates being a template (825)) in a reference picture (811). The template (821) of the current CU (801) can have any suitable shape and any suitable size.

In an embodiment, the template (821) of the current CU (801) includes a top template (822) and a left template (823). Each of the top template (822) and the left template (823) can have any suitable shape and any suitable size.

The top template (822) can include samples in one or more top neighboring blocks of the current CU (801). In an example, the top template (822) includes one or more rows of samples above the current CU (801). The left template (823) can include samples in one or more left neighboring blocks of the current CU (801). In an example, the left template (823) includes one or more columns of samples left to the current CU (801).

Each one (e.g., the template (825)) of the plurality of possible templates in the reference picture (811) corresponds to the template (821) in the current picture (810). In an embodiment, the initial MV (802) points from the current CU (801) to a reference block (803) in the reference picture (811). Each one (e.g., the template (825)) of the plurality of possible templates in the reference picture (811) and the template (821) in the current picture (810) can have an identical shape and an identical size. For example, the template (825) of the reference block (803) includes a top template (826) in the reference picture (811) and a left template (827) in the reference picture (811). The top template (826) can include samples above the reference block (803). The left template (827) can include samples left to the reference block (803).

A TM cost can be determined based on a pair of templates, such as the template (e.g., the current template) (821) and the template (e.g., the reference template) (825). The TM cost can indicate matching between the template (821) and the template (825). An optimized MV (or a final MV) can be determined based on a search around the initial MV (802) of the current CU (801) within a search range (815). The search range (815) can have any suitable shape and any suitable number of reference samples. In an example, the search range (815) in the reference picture (811) includes a [−L, L]-pel range where L is a positive integer, such as 8 (e.g., 8 samples). For example, a difference (e.g., [0, 1]) is determined based on the search range (815), and an intermediate MV is determined by a summation of the initial MV (802) and the difference (e.g., [0, 1]). An intermediate reference block and a corresponding template in the reference picture (811) can be determined based on the intermediate MV. A TM cost can be determined based on the template (821) and the intermediate template in the reference picture (811). The TM costs can correspond to the differences (e.g., [0, 0] corresponding to the initial MV (802), [0, 1], and the like) that are determined based on the search range (815). In an example, the difference corresponding to the smallest TM cost is selected, and the optimized MV is the summation of the difference corresponding to the smallest TM cost and the initial MV (802). As described above, the TM can derive the final motion information (e.g., the optimized MV) from the initial motion information (e.g., the initial MV 802).

In the FIG. 8 example, a better MV can be searched around the initial motion vector of the current CU within a search range, such as [−8 pel, +8 pel]. In some examples (e.g., ECM), the template matching is also adopted with several modifications. In an example, search step size is determined by AMVR mode. In another example, TM can be cascaded with bilateral matching process. In another example, the template-matching is also used to reorder index of candidates in the merge candidate list and AMVP candidate list.

In some examples, a TM process can be applied in an affine mode, such as the affine AMVP mode, the affine merge mode, and can be referred to as an affine TM.

Figure 9:
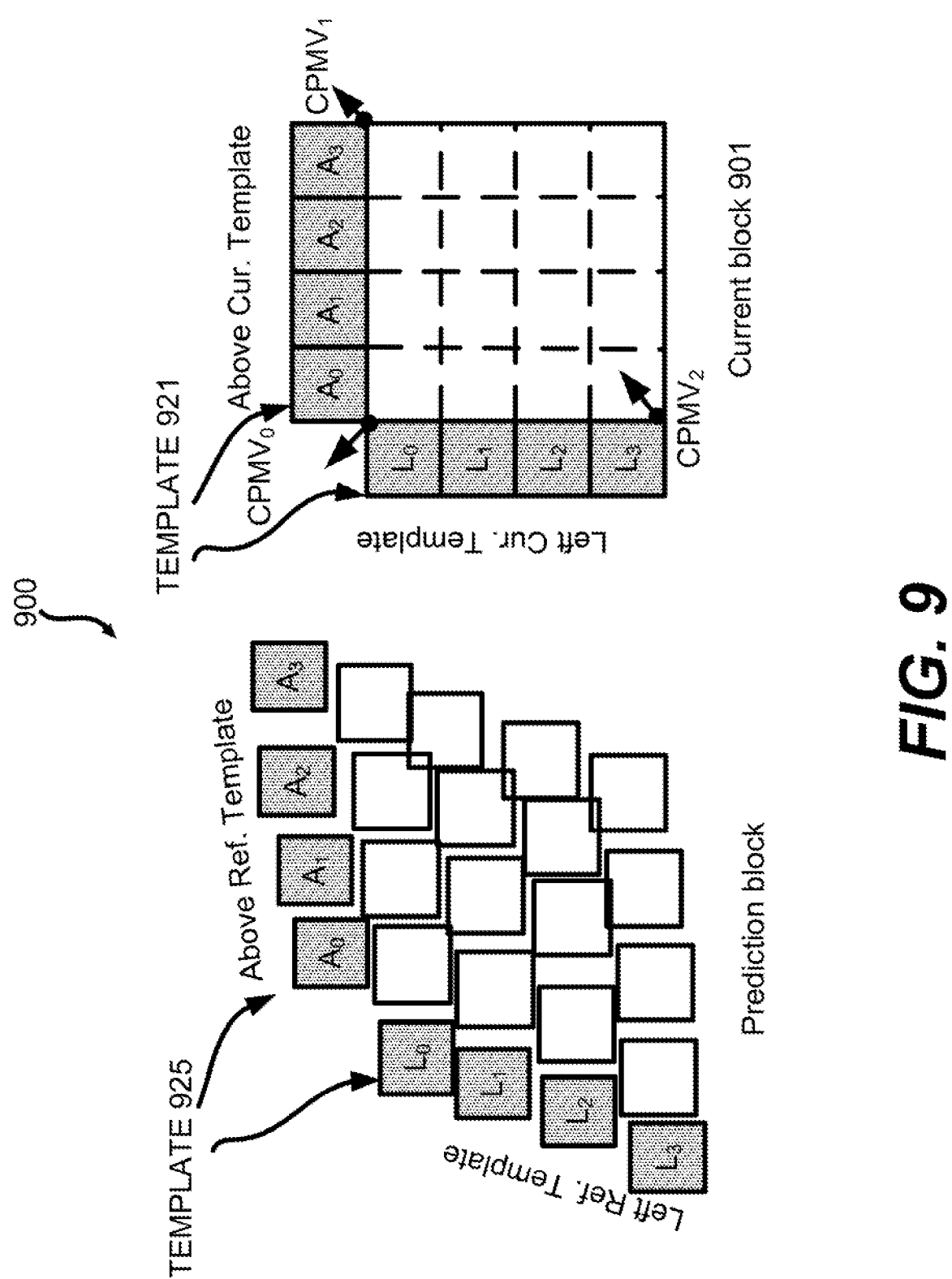
FIG. 9 shows an example of template matching in an affine merge mode.

FIG. 9 shows an example of TM (900), such as in an affine merge mode. A template (921) of a current block (e.g., a current CU) (901) can be similarly defined as the template (821) in FIG. 8 in a TM applied to a translational motion model. A reference template (925) of a reference block in a reference picture can include multiple subblock templates (e.g., 4×4 subblocks) that are pointed by control point MV (CPMV)-derived MVs of neighboring subblocks (e.g., $A_0$-$A_3$ and $L_0$-$L_3$ as shown in FIG. 9) at block boundaries.

In some examples, a search process of the TM that is applied in the affine mode (e.g., the affine merge mode) (also referred to as affine TM) can start from a $CPMV_0$, while keeping other CPMV(s) (e.g., (i) $CPMV_1$ when a 4-parameter model is used or (ii) $CPMV_1$ and $CPMV_2$ when a 6-parameter model is used) constant. The search can be performed toward a horizontal direction and a vertical direction. In an example, the search is followed by diagonal direction(s) only if a zero vector is not the best difference vector found from the horizontal search and/or the vertical search. The affine TM can repeat the same search process for the $CPMV_1$. The affine TM can repeat the same search process for $CPMV_2$ when a 6-parameter model is used. Based on the refined CPMVs, the whole search process can restart (iterate) from the refined CPMV0, if the zero vector is not the best difference vector from the previous iteration and the search process has iterated less than 3 times.

In some examples (e.g., AV1), a technique that is referred to as difference weighted bi-prediction can be used. For example, in AV1, a difference weighted predictor can be used for bi-prediction. The weighting coefficient (e.g., weight) is computed per pixel based on the difference between two reference pixels. Generally speaking, when a pair of reference pixels have big difference, one of the two reference pixels is assigned with a greater weight. In an example, a binary sign can be signaled at coded block level to indicate which reference block has greater weight when the pixel difference is above a certain threshold. The binary sign can correspond to reference index for higher weight value in some examples. For example, the binary sign being 0 can correspond to assigning higher weight value to reference 0 (indicating a reference pixel or a reference block in a reference picture from the reference picture list 0), and binary sign being 1 can correspond to assigning higher weight value to reference 1 (indicating a reference pixel or a reference block in a reference picture from the reference picture list 1).

For example, m(x, y) denotes the weighting coefficient for reference 0 picture at pixel location (x, y). The sum of total weighting is 64 and when the reference pixel difference at (x, y) is greater than or equal to 16, m(x, y) is set to a different value than a default constant.

In an example, Eq. (2) is used to assign m(x, y) to the reference block 0 (the reference block in a reference picture obtained from the reference picture list 0) based on the binary sign:

$$m(x, y) = \begin{cases} 38 + \dfrac{|R_1(x, y) - R_2(x, y)|}{16}, & \text{sign} = 0 \\ 64 - \left(38 + \dfrac{|R_1(x, y) - R_2(x, y)|}{16}\right), & \text{sign} = 1 \end{cases} \qquad \text{Eq. (2)}$$

Eq. (2) includes a first formula (also referred to as above formula) associated with sign being 0, and a second formula (also referred to as bottom formula) associated with sign being 1. When sign=0, the first (above) formula in Eq. (2) is assigned to the weighting coefficient of reference 0 pixel at (x, y) ($R_1(x, y)$ denotes the reference 0 pixel at (x,y)), the second (bottom) formula is assigned to weighting coefficient of reference 1 pixel at (x, y) ($R_2(x, y)$ denotes the reference 1 pixel at (x,y)). When the sign=1, the second (bottom) formula is assigned to the weighting coefficient of reference 0 pixel at (x, y), and the first (above) formula is assigned to weighting coefficient of reference 1 pixel at (x, y). It is noted that m(x, y) is further capped by [0, 64].

In some examples, the binary sign (also referred to as flag) is signaled at the block level to indicate which of the reference blocks in the bi-prediction have greater weight value (or smaller weight value). For example, when the binary sign is 0, the reference block obtained based on the reference picture list 0 (e.g., reference 0 pixel), has the greater weight; and when the binary sign is 1, the reference block obtained based on the reference picture list 1 (e.g., reference 1 pixel) has the greater weight.

In some examples, the weights (also referred to as weight values, or weight coefficients) are determined by pixel based on difference between the reference pixels (pixels in the reference blocks that are col-located with the current pixel in the current block) for the current pixel. In an example, when the absolute value of difference between the reference pixels is smaller than a threshold, default weights are assigned to the reference pixels according to the binary sign. For example, the total weight is 64, when the absolute value of difference between the reference pixels in smaller than 16, in response to the binary sign being zero, a higher weight 38 is assigned to the reference 0 pixel, and a lower weight 26 is assigned to the reference 1 pixel. Similarly, the total weight is 64, when the absolute value of difference between the reference pixels in smaller than 16, in response to the binary sign being one, a higher weight 38 is assigned to the reference 1 pixel, and a lower weight 26 is assigned to the reference 0 pixel.

Further, when the absolute value of the difference between the reference pixels is equal or larger than 16, the weights are determined according to Eq. (2).

The difference weighted bi-prediction utilizes the pixel difference to derive the weight of bi-prediction at pixel level. However, a flag (also referred to as binary sign) is signalled at block level to indicate which reference block (e.g., from reference picture list 0 or from reference picture list 1) is prevailing (e.g., using the formula associated with sign=0 in Eq. (2)), that has a higher weight. Some aspects of the disclosure provide techniques to determine which reference block is prevailing using reduced signaling overhead. For example, a plurality of weight candidates for bi-prediction includes at least a first weight candidate for a difference weighted bi-prediction with a first sign value and a second weight candidate for the difference weighted bi-prediction with a second sign value. Encoder/decoder can calculate a first cost value for the first weight candidate and a second cost value for the second weight candidate and select a weight candidate from the first weight candidate and the second weight candidate according to the first cost value and the second cost value. For the difference weighted bi-prediction, encoder/decoder can determine a first weight value and a second weight value based on a difference between a first reference pixel and a second reference pixel for a current pixel in the current block. The first reference pixel is in a first reference block from a first reference picture, the second reference pixel is in a second reference block from a second reference picture. The encoder/decoder assigns the first weight value and the second weight value to the first reference pixel in the first reference block and the second reference pixel in the second reference block based on a sign value associated with the selected weight candidate. The sign value indicates a specific one of the first reference block and the second reference block to be assigned with a larger weight value. Then, the encoder/decoder reconstructs the current pixel based on a weighted sum of the first reference pixel and the second reference pixel according to the first weight value and the second weight value.

According to an aspect of the disclosure, which reference block has greater weight (e.g., using the first formula associated with sign=0 in Eq. (2)) can be determined by using template-matching (TM) when the difference weighted bi-prediction is selected. In some examples, the difference weighted bi-prediction is applied to templates of reference block 0 (e.g., reference block obtained based on the reference picture list 0) and reference block 1 (e.g., reference block obtained based on the reference picture list 1) to obtain a reference template when the current template of the coded block (also referred to as current block) is available. The template-matching (TM) cost can be calculated using any suitable calculation, such as the sum of absolute differences (SAD), sum of absolute transformed differences (SATD), standard error of estimate (SEE) and the like, between the current template and the reference template. The template-matching process of two difference weighted bi-prediction are tested. One is sign=0 in Eq. (2) for reference block 0, another one is sign=0 in Eq. (2) for reference block 1.

For example, to perform a first test of the TM process for the difference weighted bi-prediction, the binary sign being zero is used. The first formula in Eq. (2) is used to determine weight by pixels for a template of the reference block 0, the second formular in Eq. (2) is used to determine weight by pixels for a template of the reference block 1. The template of the reference block 0 and the template of the reference block 1 are weighed accordingly to generate a reconstructed template that is referred to as a first reference template. Then, a first TM cost is calculated between the first reference template and the current template of the current block. Similarly, to perform a second test of the TM process for the difference weighted bi-prediction, the binary sign being one is used. The first formula in Eq. (2) is used to determine weight by pixel for template of the reference block 1, the second formular in Eq. (2) is used to determine weight by pixels for template of the reference block 0. The template of the reference block 0 and the template of the reference block 1 are weighed accordingly to generate a reconstructed template that is referred to as a second reference template.

Then, a second TM cost is calculated between the second reference template and the current template of the current block.

In some embodiments, the reference block i assigned with the first formula (associated with sign=0 in Eq. (2)) is derived from the smallest TM cost of the two tests of difference weighted bi-prediction. The reference block i, which has the smallest TM cost, is chosen with the first formula (associated with sign=0 in Eq. (2)). Where i is 0 or 1. There is no flag to indicate which reference block has greater weight. For example, when the first TM cost is lower than second TM cost, the reference block 0 is assigned with the greater weight, for example using the first formula in Eq. (2) and the reference block 1 is assigned with the smaller weight, for example using the second formula in Eq. (2). When the second TM cost is lower than first TM cost, the reference block 1 is assigned with the greater weight, for example using the first formula in Eq. (2) and the reference block 0 is assigned with the smaller weight, for example using the second formula in Eq. (2). Since no flag is signaled for the binary sign, signaling cost is reduced.

In some embodiments, a flag is signaled to indicate the most probable reference block. In some examples, a list that is referred to as a most probable reference block list is constructed by using the TM cost in ascending order. In some examples, this flag is context coded. For example, according to the TM cost, a most probable reference block list is constructed by using the TM cost in ascending order. When the first TM cost is lower than the second TM cost, the most probable reference block list can be (reference block 0, reference block 1), then the flag being 0 indicates to assign the higher weight to the reference block 0, and the flag being 1 indicates to assign the higher weight to the reference block 1. When the first TM cost is higher than the second TM cost, the most probable reference block list can be (reference block 1, reference block 0), then the flag being 0 indicates to assign the higher weight to the reference block 1, and the flag being 1 indicates to assign the higher weight to the reference block 0. In an example, there is a much higher probability that the flag is zero, thus signaling cost can be reduced by using context coding for the flag.

According to another aspect of the disclosure, which reference block has greater weight (e.g., using the first formula associated with sign=0 in Eq. (2)) can be determined when the difference weighted bi-prediction is selected by checking the boundary cost of two different reconstruction using binary sign being 0 and 1. In an example, the boundary for the current block is defined as the first row and first column of the current block. The boundary smoothness can be determined by measuring the difference between the samples at boundary of current block and the neighboring reference samples.

Figure 10:
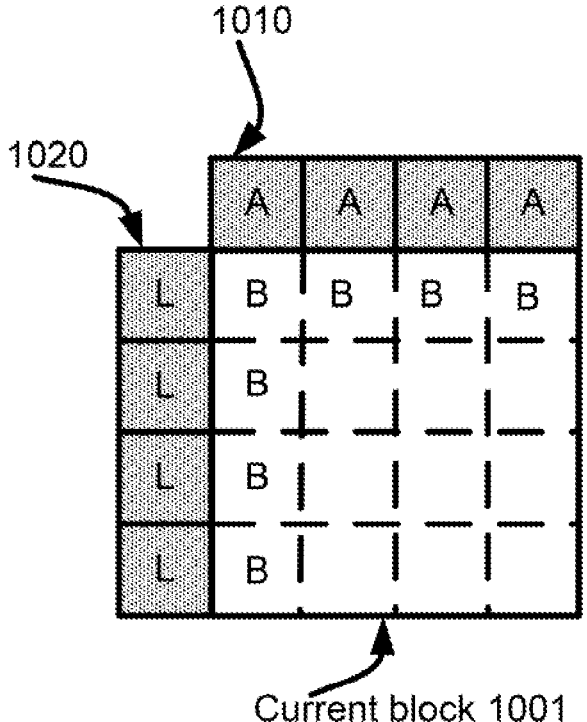
FIG. 10 shows a diagram illustrating a boundary cost calculation in some examples.

FIG. 10 shows a diagram illustrating a calculation of boundary cost in some examples. In an example, the boundary for a current block (1001) is defined as a first row and a first column of the current block, such as samples that are shown by "B" in FIG. 10. FIG. 10 also shows above reference samples (1010) (shown by "A") that are above the first row of the current block (1001), and left reference samples (1020) (shown by "L") that are left to the first column of the current block (1001). The boundary smoothness (e.g., also referred to as boundary cost) can be measured as differences of the samples (e.g., reconstructed samples) at the boundary of the current block (1001) (e.g., shown by "B"), and the neighboring reference samples (e.g., neighboring reconstructed samples, such as the above reference samples shown by "A", and the left reference samples shown by "L"). The boundary smoothness can be calculated using any suitable difference measure, such as SAD, SATD, SEE, and the like.

In some embodiments, two reconstruction blocks are generated by adding the residual block with prediction block using sign=0 and prediction block using sign=1, then the sign value associated with the smallest boundary cost (a cost value measuring the boundary smoothness of the reconstruction block) is selected as the actual prediction block.

For example, to generate a first reconstruction block for the current block using the difference weighted bi-prediction, the binary sign being zero is used. The first formula in Eq. (2) is used to determine weight by pixels for the reference block 0, the second formular in Eq. (2) is used to determine weight by pixels for the reference block 1. The reference block 0 and the reference block 1 are weighed accordingly to form a first prediction block. The first prediction block and the residual block (e.g., decoded from the coded video bitstream) are combined to generate the first reconstruction block for the current block. Then, a first boundary cost is calculated based on difference between the boundary of the first reconstruction block and the neighboring reference samples. Similarly, to generate a second reconstruction block for the current block using the difference weighted bi-prediction, the binary sign being one is used. The first formula in Eq. (2) is used to determine weight by pixels for the reference block 1, the second formular in Eq. (2) is used to determine weight by pixels for the reference block 0. The reference block 0 and the reference block 1 are weighed accordingly to form a second prediction block. The second prediction block and the residual block (e.g., decoded from the bitstream) are combined to generate the second reconstruction block for the current block. Then, a second boundary cost is calculated based on difference between the boundary of the second reconstruction block and the neighboring reference samples. In some examples, when the first boundary cost is lower than or equal to the second boundary cost, the binary sign is determined to be zero; and when the first boundary cost is higher than the second boundary cost, the binary sign is determined to be one.

In some embodiment, a flag is signaled to indicate whether the most probable sign value is applied, and the most probable sign value is derived using a most probable reference block list. The most probable reference block list is constructed by using the boundary cost in ascending order. In some examples, this flag is context coded. For example, according to the boundary cost, a most probable reference block list is constructed by using the boundary cost in ascending order. When the first boundary cost is lower than the second boundary cost, the most probable reference block list can be (reference block 0, reference block 1), then the flag being 0 indicates to assign the higher weight to the reference block 0, and the flag being 1 indicates to assign the higher weight to the reference block 1. When the first boundary cost is higher than the second boundary cost, the most probable reference block list can be (reference block 1, reference block 0), then the flag being 0 indicates to assign the higher weight to the reference block 1, and the flag being 1 indicates to assign the higher weight to the reference block 0. In an example, there is a much higher probability that the flag is zero, thus signaling cost can be reduced by using context coding for the flag.

According to another aspect of the disclosure, which reference block has greater weight (e.g., using the first formula associated with sign=0 in Eq. (2)) can be determined when the difference weighted bi-prediction is selected by the reference index used by neighboring blocks. In an example, a neighboring block of the current block is coded using the difference weighted bi-prediction with a reference block from the reference picture list i (i is 0 or 1) having the greater weight, then the current block, when coding in the difference weighted bi-prediction, can be coded with a reference block from the reference picture list i having the greater weight. Thus, the binary sign for the current block is not signaled.

According to another aspect of the disclosure, the weighting method of the reference blocks is derived by applying the different weighting method to the template samples of the current block. The predictors can include the two template areas of reference block 0 and reference block 1 (e.g., the template area of the reference block 0 and the template area of the reference block 1). Samples at all 3 template areas (e.g., template area of reference block 0, template area of reference block 1 and template area of the current block) are fully available for both encoder and decoder, so by comparing the costs of different weighting method using BCW with different candidate weights or difference weighted bi-prediction with either sign=0 or sign=1, the weighting method with a smaller cost can be chosen.

For example, the potential weighting methods can include BCW with different candidate weights, difference weighted bi-prediction with sign being zero, and difference weighted bi-prediction with sign being one. In an example, BCW has 5 different candidate weights, then there are 7 potential weighing methods including the BCW with 5 different candidate weights, and difference weighted bi-prediction with two candidate sign values. In some examples, each of the potential weighting methods can be applied to generate a reference template based on the template of reference block 0 and the template of reference block 1. The reference template and the current template are compared to compute a template matching cost value.

In some embodiments, the weighting method with the smallest TM cost is chosen. There is no flag to indicate which weighting method is chosen and no syntax to indicate which candidate weight of BCW or which sign of difference weighted bi-prediction is chosen. For example, among TM cost values associated with the potential weighting methods, a smallest TM cost value can be determined and the weighting method associated with the smallest TM cost value can be chosen to generate the final reconstruction for the current block.

In some embodiments, a flag is signaled to indicate the most probable weighting method. The most probable weighting method is either BCW with multiple candidate weights or difference weighted bi-prediction with either sign=0 or sign=1. And then a syntax is signaled to indicate which weight combination of either BCW or difference weighted bi-prediction in the list is used. For example, the potential weighting methods can have two categories, such as a first category for BCW (with multiple candidate weights), and a second category for difference weighted bi-prediction (with either sign=0 or sign=1). The flag is signaled to indicate which category of the potential weighting methods is used. When the first category is used, a syntax is signaled to indicate which candidate weight is used. When the second category is used, a syntax (e.g., a flag) is signaled to indicate the value of the binary sign.

In an embodiment, a weight combination list is formed to include the potential weighting methods, and the weight combination list is reordered by using TM cost in ascending order. For example, the weight combination list includes the potential weighting methods reordered based on TM cost in ascending order. In an example, when the first potential weighting method in the weight combination list is BCW, the flag being 0 indicates the first category for BCW is used, and the flag being 1 indicates the second category for the difference weighted bi-prediction is used. When the first potential weighting method in the weight combination list is difference weighted bi-prediction, the flag being 0 indicates the second category for the difference weighted bi-prediction is used, and the flag being 1 indicates the first category for BCW is used. It is noted that the weighting methods of BCW with multiple candidate weights can be reordered based on TM cost values in ascending order, and the weighting methods of the difference weighted bi-prediction with difference sign values can be reordered based on the TM cost values in ascending order.

In some embodiments, the weighting method with the smallest TM cost is chosen. There is no flag to indicate which kinds of weighting method is chosen. If BCW has the smallest TM cost, a syntax is used to indicate which candidate weight of BCW is chosen. Otherwise, a flag is used to indicate which sign of difference weighted bi-prediction is chosen. For example, the flag for indicating which of the first category and the second category is not signaled. When the first potential weighting method in the reordered weight combination list is of the first category, then the BCW is used, and a syntax is used to indicate which candidate weight of BCW is used. When the first potential weighting method in the reordered weight combination list is of the second category, then the difference weighted bi-prediction is used, and a flag can be signaled to indicate the value of the binary sign.

In some embodiments, the weight combination list is constructed from all weighting combination of BCW and difference weighted bi-prediction with greater weight (e.g., the first formula associated with sign=0 in Eq. (2)) for reference block 0 and reference block 1. The TM is applied for all candidates in this list and the list is reordered by using TM cost in ascending order. A syntax is signaled to indicate which candidate in the reordered list is selected. For example, the weight combination list is constructed to include the BCW with multiple candidate weights (e.g., 5 different weights), and difference weighted bi-prediction with sign value being 0 and 1. The potential weighting methods in the weight combination list is reordered according to TM cost values in ascending order. A syntax is then signaled to indicate which candidate in the reordered weight combination list is used.

Figure 11:
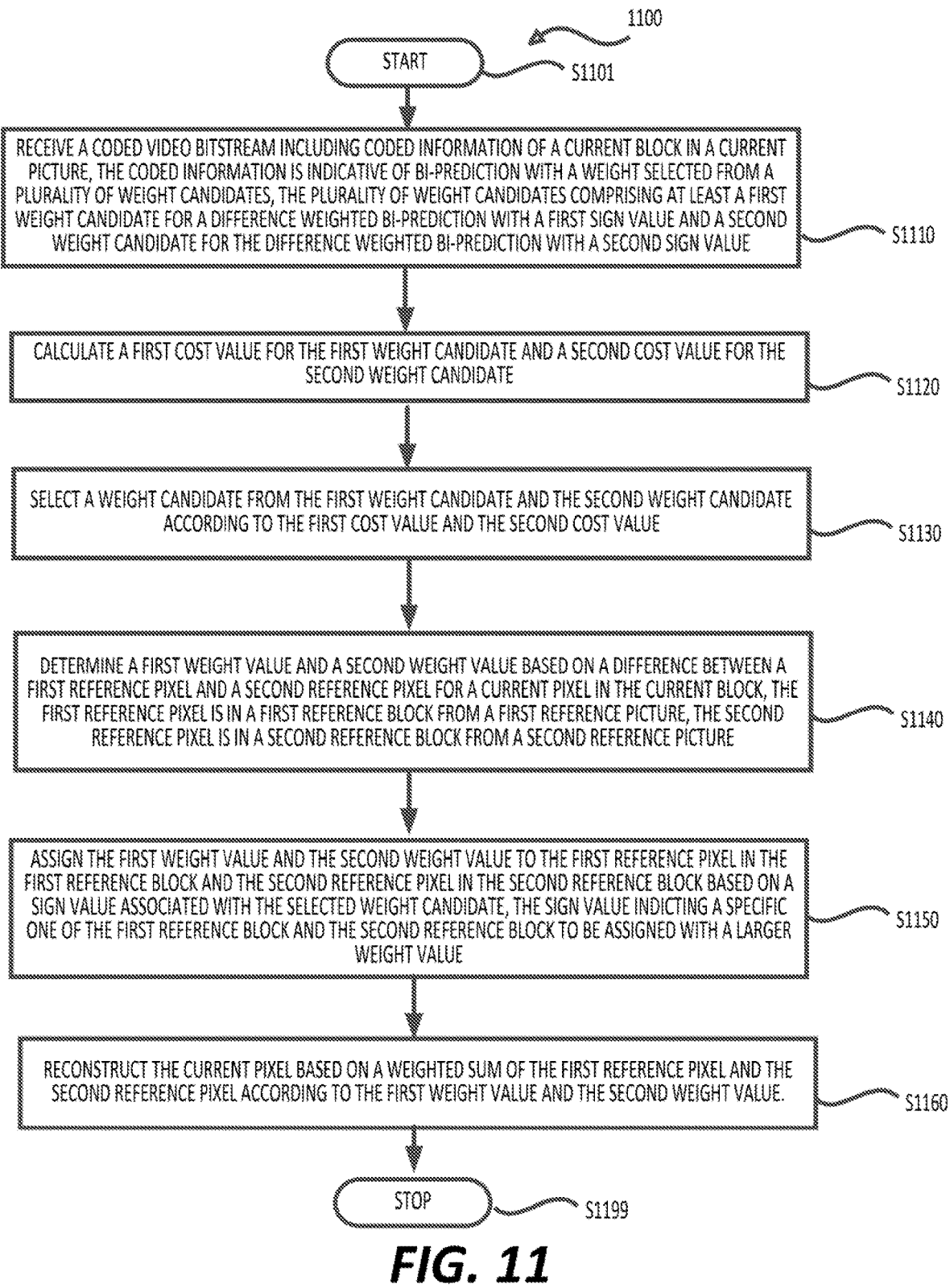
FIG. 11 shows a flow chart outlining a decoding process according to some embodiments of the disclosure.

FIG. 11 shows a flow chart outlining a process (1100) according to an embodiment of the disclosure. The process (1100) can be used in a video decoder. In various embodiments, the process (1100) is executed by processing circuitry, such as the processing circuitry that performs functions of the video decoder (110), the processing circuitry that performs functions of the video decoder (210), and the like. In some embodiments, the process (1100) is implemented in software instructions, thus when the processing circuitry executes the software instructions, the processing circuitry performs the process (1100). The process starts at (51101) and proceeds to (S1110).

At (S1110), a coded video bitstream including coded information of a current block in a current picture is received. The coded information is indicative of bi-prediction with a weight selected from a plurality of weight candidates, the plurality of weight candidates includes at least a first weight candidate for a difference weighted bi-prediction with a first sign value and a second weight candidate for the difference weighted bi-prediction with a second sign value.

In some examples, a coded video bitstream including coded information of a current block in a current picture is received. The coded information is indicative of bi-prediction with a weight selected from a plurality of weight candidates, the plurality of weight candidates includes at least a first weight candidate and a second weight candidate. The first weight candidate is a difference weighted bi-prediction with a first sign value and the second weight candidate is the difference weighted bi-prediction with a second sign value. The difference weighted bi-prediction with a sign value refers to a usage of pixel difference to derive weights of bi-prediction at a pixel level, and a usage of the sign value to indicate a direction of a larger weight value for the difference weighted bi-prediction.

At (S1120), a first cost value for the first weight candidate and a second cost value for the second weight candidate are calculated. For example, a first cost value for the difference weighted bi-prediction with the first sign value and a second cost value for the difference weighted bi-prediction with the second sign value are calculated.

At (S1130), a weight candidate is selected from the first weight candidate and the second weight candidate according to the first cost value and the second cost value. In an example, a selected sign value is determined according to the first cost value and the second cost value. The weight selected candidate is associated with the selected sign value.

At (S1140), a first weight value and a second weight value are calculated based on a difference between a first reference pixel and a second reference pixel for a current pixel in the current block, the first reference pixel is in a first reference block from a first reference picture, the second reference pixel is in a second reference block from a second reference picture.

At (S1150), the first weight value and the second weight value are assigned to the first reference pixel in the first reference block and the second reference pixel in the second reference block based on the selected sign value associated with the selected weight candidate. The selected sign value indicts a specific one of the first reference block and the second reference block to be assigned with a larger weight value.

At (S1160), the current pixel is reconstructed based on a weighted sum of the first reference pixel and the second reference pixel according to the first weight value and the second weight value.

In some examples, to calculate the first cost value and the second cost value, a first reference template for a current template of the current block is generated according to the first weight candidate, and a first template matching cost between the first reference template and the current template is calculated as the first cost value. Further, a second reference template is generated for the current template of the current block according to the second weight candidate, and a second template matching cost between the second reference template and the current template is calculated as the second cost value.

In some examples, the selected weight candidate is the one having a lowest cost value.

In some examples, to select the weight candidate, the first reference block and the second reference block are reordered in a list according to the first cost value for the first weight candidate associated with the first sign value and the second cost value for the second weight candidate associated with the second sign value, the first sign value indicates the first reference block with a higher weight value, the second sign value indicates the second reference block with a higher weight value. According to a context model, a flag is determined, and the flag indicates the weight candidate according to a most probable reference block from the list. For example, the list includes the reference blocks in most probable order. Then, in an example, the flag being 0 indicates the first most probable reference block in the list corresponds to the selected weight candidate; and the flag being 0 indicates the first most probable reference block in the list does not correspond to the selected weight candidate.

In some examples, to calculate the first cost value and the second cost value, a first reconstruction block for the current block is generated according to the first weight candidate, then a first boundary cost between a boundary of the first reconstruction block and reconstructed neighboring samples of the current block is calculated as the first cost value. Further, a second reconstruction block for the current block is generated according to the second weight candidate, and then a second boundary cost between a boundary of the second reconstruction block and the reconstructed neighboring samples of the current block is calculated as the second cost value.

In an example, a residual block of the current block is combined with a first prediction block that is predicted by the difference weighted bi-prediction with the first weight candidate to generate the first reconstruction block; and the residual block of the current block is combined with a second prediction block that is predicted by the difference weighted bi-prediction with the second weight candidate to generate the second reconstruction block.

In some examples, to select the weight candidate, a neighboring block of the current block that is coded with the difference weighted bi-prediction is identified, and the weight candidate is selected according to a reference index used by the neighboring block, the reference index corresponds to the sign value of the weight candidate. For example, when the sign is 0, the reference index is 0; and when the sign is 1, the reference index is 1.

In some examples, the plurality of weight candidates includes the first weight candidate and the second weight candidate associated with different sign values for the difference weighted bi-prediction, and multiple weight candidates of bi-prediction with coding unit level weight (BCW) with different weights.

In an example, a flag is decoded from the coded information of the current block, the flag indicates one of the difference weighted bi-prediction and the BCW. In response to the flag indicating the difference weighted bi-prediction, a first syntax (e.g., a flag) that indicates the weight candidate from the first weight candidate and the second weight candidate is decoded from the coded information. In response to the flag indicating the BCW, a second syntax that indicates a specific weight candidate of the BCW is decoded from the coded information.

In some examples, template matching cost values respectively for the plurality of weight candidates are calculated, and the weight candidate with a lowest template matching value is selected.

In some examples, template matching cost values respectively for the plurality of weight candidates are calculated. In response to a lowest template matching cost value being associated with the difference weighted bi-prediction, a first syntax is decoded from the coded information of the current block, the first syntax indicates the weight candidate from the first weight candidate and the second weight candidate. In response to the lowest template matching cost value being associated with the BCW, a second syntax is decoded from the coded information of the current block, the second syntax indicates a specific weight candidate of the BCW.

In some examples, template matching cost values respectively for the plurality of weight candidates are calculated. The plurality of weight candidates are reordered according to the template matching cost values. A syntax is decoded from the coded information of the current block, the syntax indicates the weight candidate from the plurality of weight candidates that are reordered.

Then, the process proceeds to (S1199) and terminates.

The process (1100) can be suitably adapted. Step(s) in the process (1100) can be modified and/or omitted. Additional step(s) can be added. Any suitable order of implementation can be used.

Figure 12:
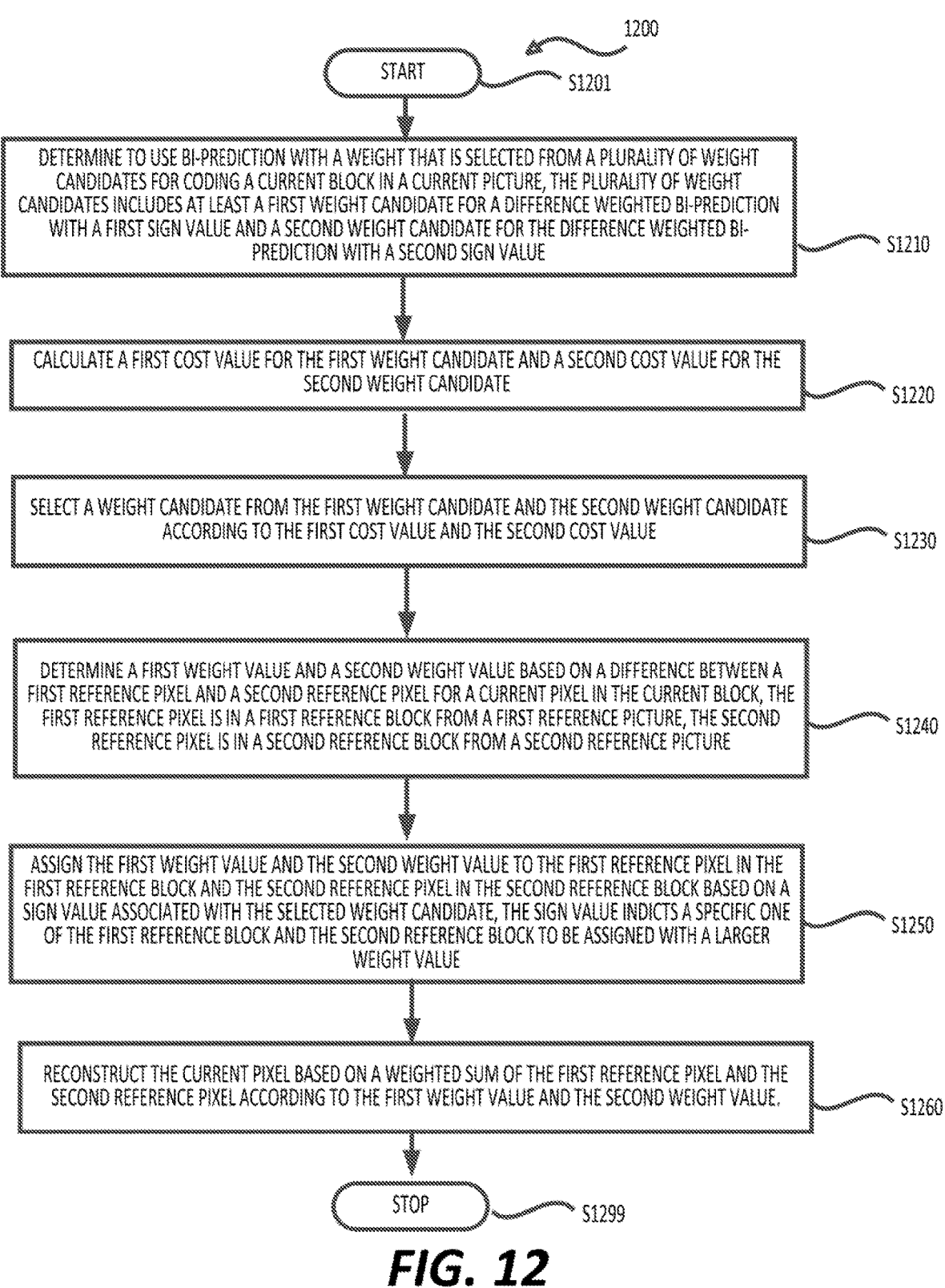
FIG. 12 shows a flow chart outlining an encoding process according to some embodiments of the disclosure.

FIG. 12 shows a flow chart outlining a process (1200) according to an embodiment of the disclosure. The process (1200) can be used in a video encoder. In various embodiments, the process (1200) is executed by processing circuitry, such as the processing circuitry that performs functions of the video encoder (103), the processing circuitry that performs functions of the video encoder (303), and the like. In some embodiments, the process (1200) is implemented in software instructions, thus when the processing circuitry executes the software instructions, the processing circuitry performs the process (1200). The process starts at (S1201) and proceeds to (S1210).

At (S1210), to use bi-prediction with a weight that is selected from a plurality of weight candidates for coding a current block in a current picture is determined. The plurality of weight candidates includes at least a first weight candidate for a difference weighted bi-prediction with a first sign value and a second weight candidate for the difference weighted bi-prediction with a second sign value.

At (S1220), a first cost value for the first weight candidate and a second cost value for the second weight candidate are calculated.

At (S1230), a weight candidate is selected from the first weight candidate and the second weight candidate according to the first cost value and the second cost value.

At (S1240), according to the selected weight candidate, a first weight value and a second weight value are calculated based on a difference between a first reference pixel and a second reference pixel for a current pixel in the current block, the first reference pixel is in a first reference block from a first reference picture, the second reference pixel is in a second reference block from a second reference picture At (S1250), the first weight value and the second weight value are assigned to the first reference pixel in the first reference block and the second reference pixel in the second reference block based on a sign value associated with the selected weight candidate, the sign value indicates a specific one of the first reference block and the second reference block to be assigned with a larger weight value.

At (S1260), the current pixel is reconstructed based on a weighted sum of the first reference pixel and the second reference pixel according to the first weight value and the second weight value.

In some examples, to calculate the first cost value and the second cost value, a first reference template for a current template of the current block is generated according to the first weight candidate, and a first template matching cost between the first reference template and the current template is calculated as the first cost value. Further, a second reference template is generated for the current template of the current block according to the second weight candidate, and a second template matching cost between the second reference template and the current template is calculated as the second cost value.

In some examples, the selected weight candidate is the one having a lowest cost value.

In some examples, to select the weight candidate, the first reference block and the second reference block are reordered in a list according to the first cost value for the first weight candidate associated with the first sign value and the second cost value for the second weight candidate associated with the second sign value, the first sign value indicates the first reference block with a higher weight value, the second sign value indicates the second reference block with a higher weight value. According to a context model, a flag is encoded, and the flag indicates the weight candidate according to a most probable reference block from the list. For example, the list includes the reference blocks in most probable order. Then, in an example, the flag being 0 indicates the first most probable reference block in the list corresponds to the selected weight candidate; and the flag being 0 indicates the first most probable reference block in the list does not correspond to the selected weight candidate.

In some examples, to calculate the first cost value and the second cost value, a first reconstruction block for the current block is generated according to the first weight candidate, then a first boundary cost between a boundary of the first reconstruction block and reconstructed neighboring samples of the current block is calculated as the first cost value. Further, a second reconstruction block for the current block is generated according to the second weight candidate, and then a second boundary cost between a boundary of the second reconstruction block and the reconstructed neighboring samples of the current block is calculated as the second cost value.

In an example, a residual block of the current block is combined with a first prediction block that is predicted by the difference weighted bi-prediction with the first weight candidate to generate the first reconstruction block; and the residual block of the current block is combined with a second prediction block that is predicted by the difference weighted bi-prediction with the second weight candidate to generate the second reconstruction block.

In some examples, to select the weight candidate, a neighboring block of the current block that is coded with the difference weighted bi-prediction is identified, and the weight candidate is selected according to a reference index used by the neighboring block, the reference index corresponds to the sign value of the weight candidate. For example, when the sign is 0, the reference index is 0; and when the sign is 1, the reference index is 1.

In some examples, the plurality of weight candidates includes the first weight candidate and the second weight candidate associated with different sign values for the difference weighted bi-prediction, and multiple weight candidates of bi-prediction with coding unit level weight (BCW) with different weights.

In an example, a flag is encoded into the coded information of the current block, the flag indicates one of the difference weighted bi-prediction and the BCW for the selected weight candidate. In response to the flag indicating the difference weighted bi-prediction, a first syntax (e.g., a flag) that indicates the weight candidate from the first weight candidate and the second weight candidate is encoded into the coded information. In response to the flag indicating the BCW, a second syntax that indicates a specific weight candidate of the BCW is encoded into the coded information.

In some examples, template matching cost values respectively for the plurality of weight candidates are calculated, and the weight candidate with a lowest template matching value is selected.

In some examples, template matching cost values respectively for the plurality of weight candidates are calculated. In response to a lowest template matching cost value being associated with the difference weighted bi-prediction, a first syntax is encoded into the coded information of the current block, the first syntax indicates the weight candidate from the first weight candidate and the second weight candidate. In response to the lowest template matching cost value being associated with the BCW, a second syntax is encoded into the coded information of the current block, the second syntax indicates a specific weight candidate of the BCW.

In some examples, template matching cost values respectively for the plurality of weight candidates are calculated. The plurality of weight candidates are reordered according to the template matching cost values. A syntax is encoded not the coded information of the current block, the syntax indicates the weight candidate from the plurality of weight candidates that are reordered.

Then, the process proceeds to (S1299) and terminates.

The process (1200) can be suitably adapted. Step(s) in the process (1200) can be modified and/or omitted. Additional step(s) can be added. Any suitable order of implementation can be used.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
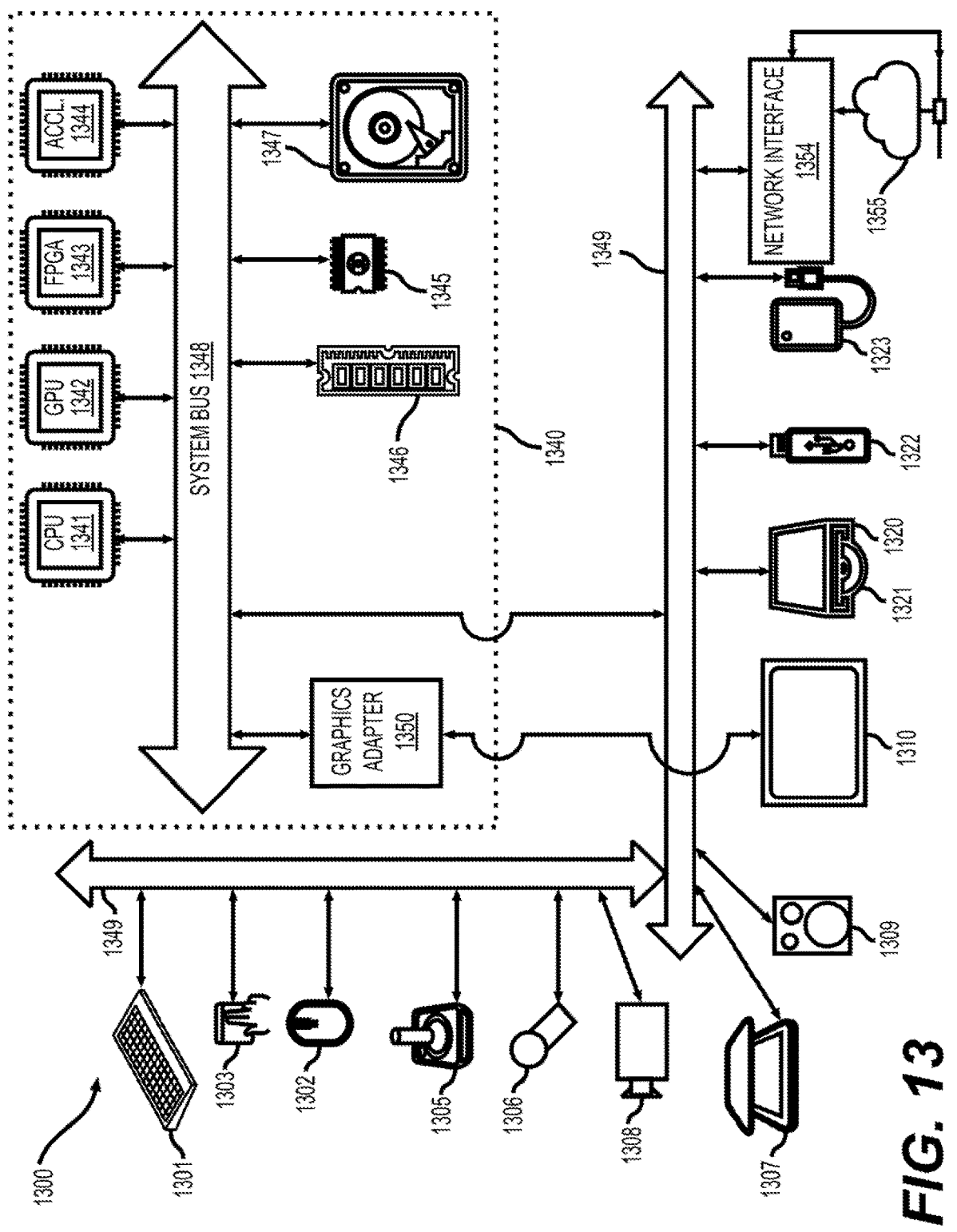
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface (1354) to one or more communication networks (1355). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), graphics adapters (1350), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). In an example, the screen (1310) can be connected to the graphics adapter (1350). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding, comprising:

receiving a coded video bitstream comprising coded information of a current block in a current picture, the coded information indicative of bi-prediction with a weight selected from a plurality of weight candidates, the plurality of weight candidates comprising at least a first weight candidate that is a difference weighted bi-prediction with a first sign value and a second weight candidate that is the difference weighted bi-prediction with a second sign value, wherein the difference weighted bi-prediction uses pixel difference to derive weights of bi-prediction at a pixel level with a sign value indicating a direction of a larger weight value for the difference weighted bi-prediction;

calculating a first cost value based on a current template of the current block and a first reference template of the current block, the first reference template being a combination of a weighted template of a first reference block weighted according to a first weight formula and a weighted template of a second reference block weighted according to a second weight formula corresponding to the first sign value;

calculating a second cost value based on the current template of the current block and a second reference template of the current block, the second reference template being a combination of a weighted template of the first reference block weighted according to the second weight formula and a weighted template of the second reference block weighted according to the first weight formula corresponding to the second sign value;

determining a selected sign value from the first sign value and the second sign value according to the first cost value and the second cost value;

determining a first weight value and a second weight value based on a difference between a first reference pixel and a second reference pixel for a current pixel in the current block, the first reference pixel being in the first reference block from a first reference picture, the second reference pixel being in the second reference picture; and reconstructing the current pixel based on a weighted sum of the first reference pixel and the second reference pixel according to the first weight value, the second weight value and the selected sign value.

2. The method of claim 1, wherein the calculating the first cost value and the second cost value further comprises:

generating the first reference template for the current template of the current block according to the first sign value;

calculating a first template matching cost between the first reference template and the current template as the first cost value;

generating the second reference template for the current template of the current block according to the second sign value; and calculating a second template matching cost between the second reference template and the current template as the second cost value.

3. The method of claim 1, wherein the determining the selected sign value further comprises:

determining the selected sign value that has a lowest cost value.

4. The method of claim 1, wherein the determining the selected sign value further comprises:

reordering the first reference block and the second reference block in a list according to the first cost value associated with the first sign value and the second cost value associated with the second sign value, the first sign value indicating the first reference block with a higher weight value, the second sign value indicating the second reference block with a higher weight value; and determining, according to a context model, a flag that indicates a most probable reference block from the list.

5. The method of claim 1, wherein the calculating the first cost value and the second cost value further comprises:

generating a first reconstruction block for the current block according to the first sign value;

calculating a first boundary cost between a boundary of the first reconstruction block and reconstructed neighboring samples of the current block as the first cost value;

generating a second reconstruction block for the current block according to the second sign value; and calculating a second boundary cost between a boundary of the second reconstruction block and the reconstructed neighboring samples of the current block as the second cost value.

6. The method of claim 5, wherein the generating the first reconstruction block comprises:

combining a residual block of the current block with a prediction block that is predicted by the difference weighted bi-prediction with the first sign value to generate the first reconstruction block.

7. The method of claim 1, wherein the determining the selected sign value further comprises:

determining that a neighboring block of the current block is coded with the difference weighted bi-prediction; and determining the selected sign value according to a reference index used by the neighboring block.

8. The method of claim 1, wherein the plurality of weight candidates comprises the first weight candidate and the second weight candidate associated with different sign values for the difference weighted bi-prediction, and multiple weight candidates of bi-prediction with coding unit level weight (BCW) with different weights.

9. The method of claim 8, further comprising:

decoding a flag from the coded information of the current block that indicates one of the difference weighted bi-prediction and the BCW;

when the flag indicates the difference weighted bi-prediction, decoding a first syntax that indicates a weight candidate from the first weight candidate and the second weight candidate; and when the flag indicates the BCW, decoding a second syntax that indicates a specific weight candidate of the BCW.

10. The method of claim 8, further comprising:

calculating template matching cost values respectively for the plurality of weight candidates; and selecting a weight candidate with a lowest template matching value.

11. The method of claim 8, further comprising:

calculating template matching cost values respectively for the plurality of weight candidates;

when a lowest template matching cost value is associated with the difference weighted bi-prediction, decoding, from the coded information of the current block, a first syntax that indicates a weight candidate from the first weight candidate and the second weight candidate; and when the lowest template matching cost value is associated with the BCW, decoding, from the coded information of the current block, a second syntax that indicates a specific weight candidate of the BCW.

12. The method of claim 8, further comprising:

calculating template matching cost values respectively for the plurality of weight candidates;

reordering the plurality of weight candidates according to the template matching cost values; and decoding, from the coded information of the current block, a syntax that indicates a weight candidate from the plurality of weight candidates that are reordered.

13. A method of video encoding, comprising:

determining that bi-prediction with a weight selected from a plurality of weight candidates is to be applied to a current block in a current picture, the plurality of weight candidates comprising at least a first weight candidate that is a difference weighted bi-prediction with a first sign value and a second weight candidate that is the difference weighted bi-prediction with a second sign value, wherein the difference weighted bi-prediction uses pixel difference to derive weights of bi-prediction at a pixel level with a sign value indicating a direction of a larger weight value for the difference weighted bi-prediction;

calculating a first cost value based on a current template of the current block and a first reference template of the current block, the first reference template being a combination of a weighted template of a first reference block weighted according to a first weight formula and a weighted template of a second reference block weighted according to a second weight formula corresponding to the first sign value;

calculating a second cost value based on the current template of the current block and a second reference template of the current block, the second reference template being a combination of a weighted template of the first reference block weighted according to the second weight formula and a weighted template of the second reference block weighted according to the first weight formula corresponding to the second sign value;

determining a selected sign value from the first sign value and the second sign value according to the first cost value and the second cost value;

determining a first weight value and a second weight value based on a difference between a first reference pixel and a second reference pixel for a current pixel in the current block, the first reference pixel being in the first reference block from a first reference picture, the second reference pixel being in the second reference block from a second reference picture; and encoding the current pixel of the current block in a bitstream based on a weighted sum of the first reference pixel and the second reference pixel according to the first weight value, the second weight value and the selected sign value.

14. The method of claim 13, wherein the calculating the first cost value and the second cost value further comprises:

generating the first reference template for the current template of the current block according to the first sign value;

calculating a first template matching cost between the first reference template and the current template as the first cost value;

generating the second reference template for the current template of the current block according to the second sign value; and calculating a second template matching cost between the second reference template and the current template as the second cost value.

15. The method of claim 13, wherein the determining the selected sign value further comprises:

determining the selected sign value that has a lowest cost value.

16. The method of claim 13, wherein the determining the selected sign value further comprises:

reordering the first reference block and the second reference block in a list according to the first cost value associated with the first sign value and the second cost value associated with the second sign value, the first sign value indicating the first reference block with a higher weight value, the second sign value indicating the second reference block with a higher weight value; and encoding, according to a context model, a flag that indicates a most probable reference block from the list in the bitstream.

17. The method of claim 13, wherein the calculating the first cost value and the second cost value further comprises:

generating a first reconstruction block for the current block according to the first sign value;

calculating a first boundary cost between a boundary of the first reconstruction block and reconstructed neighboring samples of the current block as the first cost value;

generating a second reconstruction block for the current block according to the second sign value; and calculating a second boundary cost between a boundary of the second reconstruction block and the reconstructed neighboring samples of the current block as the second cost value.

18. The method of claim 17, wherein the generating the first reconstruction block comprises:

combining a residual block of the current block with a prediction block that is predicted by the difference weighted bi-prediction with the first sign value to generate the first reconstruction block.

19. The method of claim 13, wherein the determining the selected sign value further comprises:

determining that a neighboring block of the current block is coded with the difference weighted bi-prediction; and determining the selected sign value according to a reference index used by the neighboring block.

20. A non-transitory computer-readable storage medium storing instructions which when executed by a processor cause the processor to perform an encoding method comprising:

determining that bi-prediction with a weight selected from a plurality of weight candidates is to be applied to a current block in a current picture, the plurality of weight candidates comprising at least a first weight candidate that is a difference weighted bi-prediction with a first sign value and a second weight candidate that is the difference weighted bi-prediction with a second sign value, wherein the difference weighted bi-prediction uses pixel difference to derive weights of bi-prediction at a pixel level with a sign value indicating a direction of a larger weight value for the difference weighted bi-prediction;

calculating a first cost value based on a current template of the current block and a first reference template of the current block, the first reference template being a combination of a weighted template of a first reference block weighted according to a first weight formula and a weighted template of a second reference block weighted according to a second weight formula corresponding to the first sign value;

calculating a second cost value based on the current template of the current block and a second reference template of the current block, the second reference template being a combination of a weighted template of the first reference block weighted according to the second weight formula and a weighted template of the second reference block weighted according to the first weight formula corresponding to the second sign value;

determining a selected sign value from the first sign value and the second sign value according to the first cost value and the second cost value;

determining a first weight value and a second weight value based on a difference between a first reference pixel and a second reference pixel for a current pixel in the current block, the first reference pixel being in the first reference block from a first reference picture, the second reference pixel being in the second reference block from a second reference picture;

encoding the current pixel of the current block in a bitstream based on a weighted sum of the first reference pixel and the second reference pixel according to the first weight value, the second weight value and the selected sign value; and transmitting the encoded bitstream.

* * * * *